(12) United States Patent
Nakamura et al.

(10) Patent No.: US 11,305,244 B2
(45) Date of Patent: Apr. 19, 2022

(54) GAS-LIQUID CONTACT APPARATUS

(71) Applicant: IHI Corporation, Tokyo (JP)

(72) Inventors: Shiko Nakamura, Tokyo (JP);
Yoshiyuki Iso, Tokyo (JP); Kenji Takano, Tokyo (JP); Shinya Okuno, Tokyo (JP); Ryosuke Ikeda, Tokyo (JP); Hirohito Okuhara, Tokyo (JP)

(73) Assignee: IHI Corporation, Tokyo (JP)

( * ) Notice: Subject to any disclaimer, the term of this patent is extended or adjusted under 35 U.S.C. 154(b) by 45 days.

(21) Appl. No.: 17/068,005

(22) Filed: Oct. 12, 2020

(65) Prior Publication Data
US 2021/0031154 A1 Feb. 4, 2021

Related U.S. Application Data

(63) Continuation of application No. PCT/JP2018/016750, filed on Apr. 25, 2018.

(51) Int. Cl.
*B01F 23/21* (2022.01)
*B01F 35/53* (2022.01)
(Continued)

(52) U.S. Cl.
CPC ........ *B01F 23/214* (2022.01); *B01F 35/5312* (2022.01); *B01F 35/7176* (2022.01);
(Continued)

(58) Field of Classification Search
CPC ........ B01F 23/214; B01D 47/00; B01D 47/14
See application file for complete search history.

(56) References Cited

U.S. PATENT DOCUMENTS 2,077,427 A * 4/1937 Lissman ............... B01D 47/06
261/112.2
3,782,703 A 1/1974 Kolar
(Continued)

FOREIGN PATENT DOCUMENTS

JP 49-096367 A 9/1974
JP 52-39598 3/1977
(Continued)

OTHER PUBLICATIONS

International Search Report dated Aug. 7, 2018 in PCT/JP2018/016750 filed on Apr. 25, 2018, 2 pages.
(Continued)

*Primary Examiner* — Robert A Hopkins
(74) *Attorney, Agent, or Firm* — Oblon, McClelland, Maier & Neustadt, L.L.P.

(57) ABSTRACT

A gas-liquid contact apparatus has a gas-liquid contact unit, a liquid supply system, and a gas supply system. The gas-liquid contact unit includes a plurality of stages which are allocated so as to be arranged in the lateral direction. Each of the plurality of stages includes a plurality of vertical flat plates arranged parallel to each other at intervals. The liquid supply system supplies a liquid to the gas-liquid contact unit, and causes the liquid to be circulated along the arrangement of the plurality of stages successively. The gas supply system supplies a gas to the gas-liquid contact unit, and causes the gas to be circulated along the arrangement of the plurality of stages successively. The supplied liquid flows down on the plurality of vertical flat plates in each of the plurality of stages, and comes into contact with the supplied gas.

17 Claims, 10 Drawing Sheets

(51) Int. Cl.
*B01F 35/71* (2022.01)
*B01F 23/232* (2022.01)
*B01F 25/00* (2022.01)
*B01F 101/00* (2022.01)
*B01D 47/14* (2006.01)

(52) U.S. Cl.
CPC ....... *B01D 47/14* (2013.01); *B01F 23/232112* (2022.01); *B01F 2025/918* (2022.01); *B01F 2025/93* (2022.01); *B01F 2101/2204* (2022.01)

(56) References Cited

U.S. PATENT DOCUMENTS

| | | | |
|---|---|---|---|
| 4,039,307 A * | 8/1977 | Bondor | B01D 53/74 96/235 |
| 4,775,499 A | 10/1988 | Hongo et al. | |
| 9,545,601 B2 | 1/2017 | Nakamura et al. | |
| 9,815,018 B2 | 11/2017 | Huang et al. | |
| 9,937,463 B2 | 4/2018 | Huang et al. | |
| 2002/0178925 A1 | 12/2002 | Mimura et al. | |
| 2004/0228777 A1 | 11/2004 | Mimura et al. | |
| 2007/0039182 A1 | 2/2007 | Mimura et al. | |
| 2014/0131902 A1 | 5/2014 | Huang et al. | |
| 2014/0369913 A1 | 12/2014 | Nakamura et al. | |
| 2015/0137393 A1 | 5/2015 | Huang et al. | |

FOREIGN PATENT DOCUMENTS

| | | |
|---|---|---|
| JP | 57-081826 A | 5/1982 |
| JP | 60-197226 A | 10/1985 |
| JP | 62-289218 A | 12/1987 |
| JP | 02-245251 A | 10/1990 |
| JP | 08-290047 A | 11/1996 |
| JP | 09-210341 A | 8/1997 |
| JP | 10-000326 A | 1/1998 |
| JP | 2000-154975 A | 6/2000 |
| JP | 2000-317248 A | 11/2000 |
| JP | 2002-306958 A | 10/2002 |
| JP | 2004-358294 A | 12/2004 |
| JP | 2008-104948 A | 5/2008 |
| JP | 2013-121582 A | 6/2013 |
| JP | 2013-226476 A | 11/2013 |
| JP | 2 608 526 C1 | 1/2017 |
| JP | 2018-058008 A | 4/2018 |
| WO | WO 01/45817 A1 | 6/2001 |
| WO | WO 2013/015415 A1 | 1/2013 |

OTHER PUBLICATIONS

Japanese Office Action dated Jul. 28, 2020 in Japanese Application 2016-232125, 3 pages.
Australian Office Action dated Aug. 6, 2021 in Australian Patent Application No. 2018420752, 5 pages.
Japanese Office Action dated Aug. 17, 2021 in Japanese Patent Application No. 2020-515362, 3 pages.

* cited by examiner

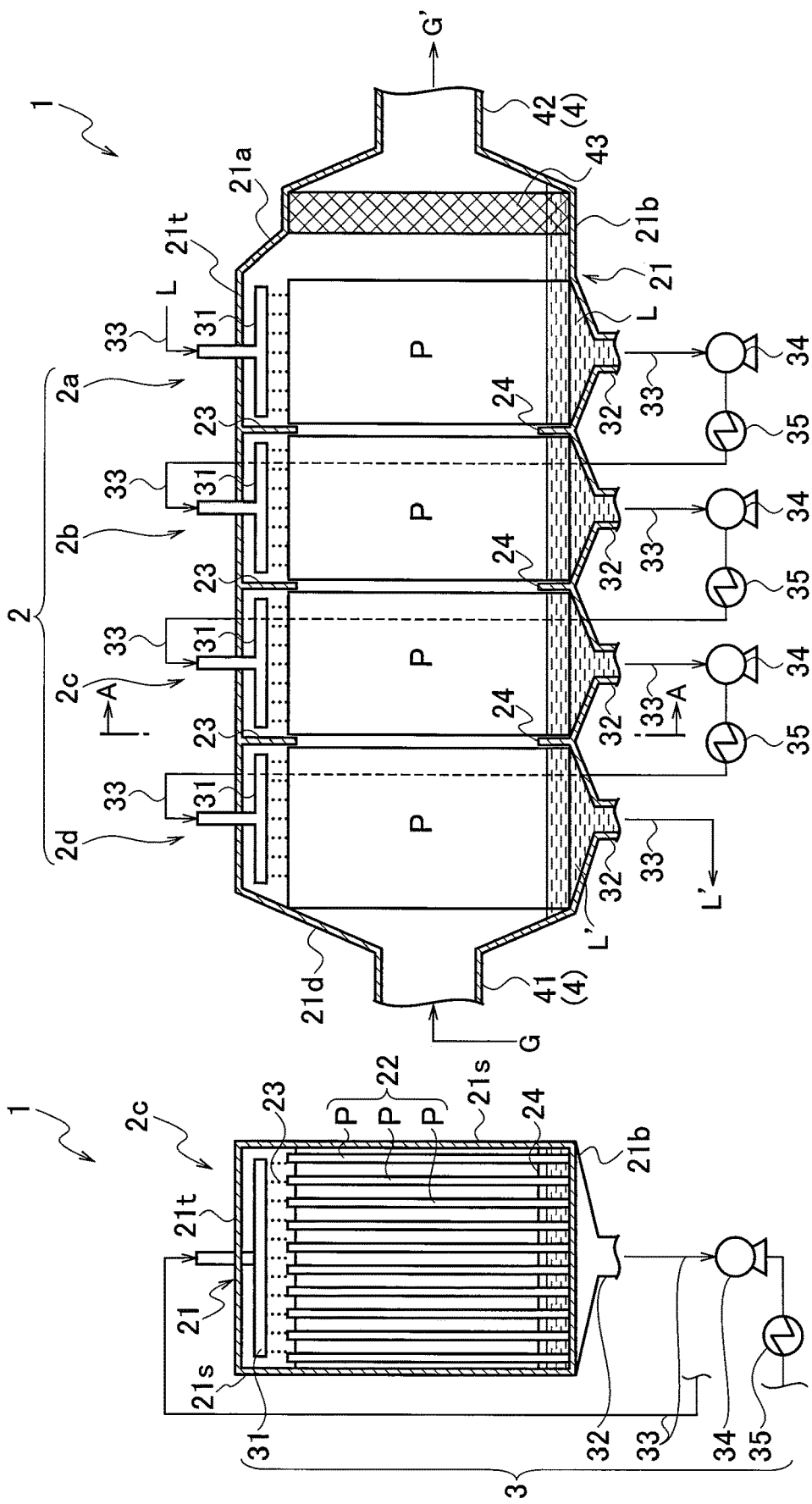

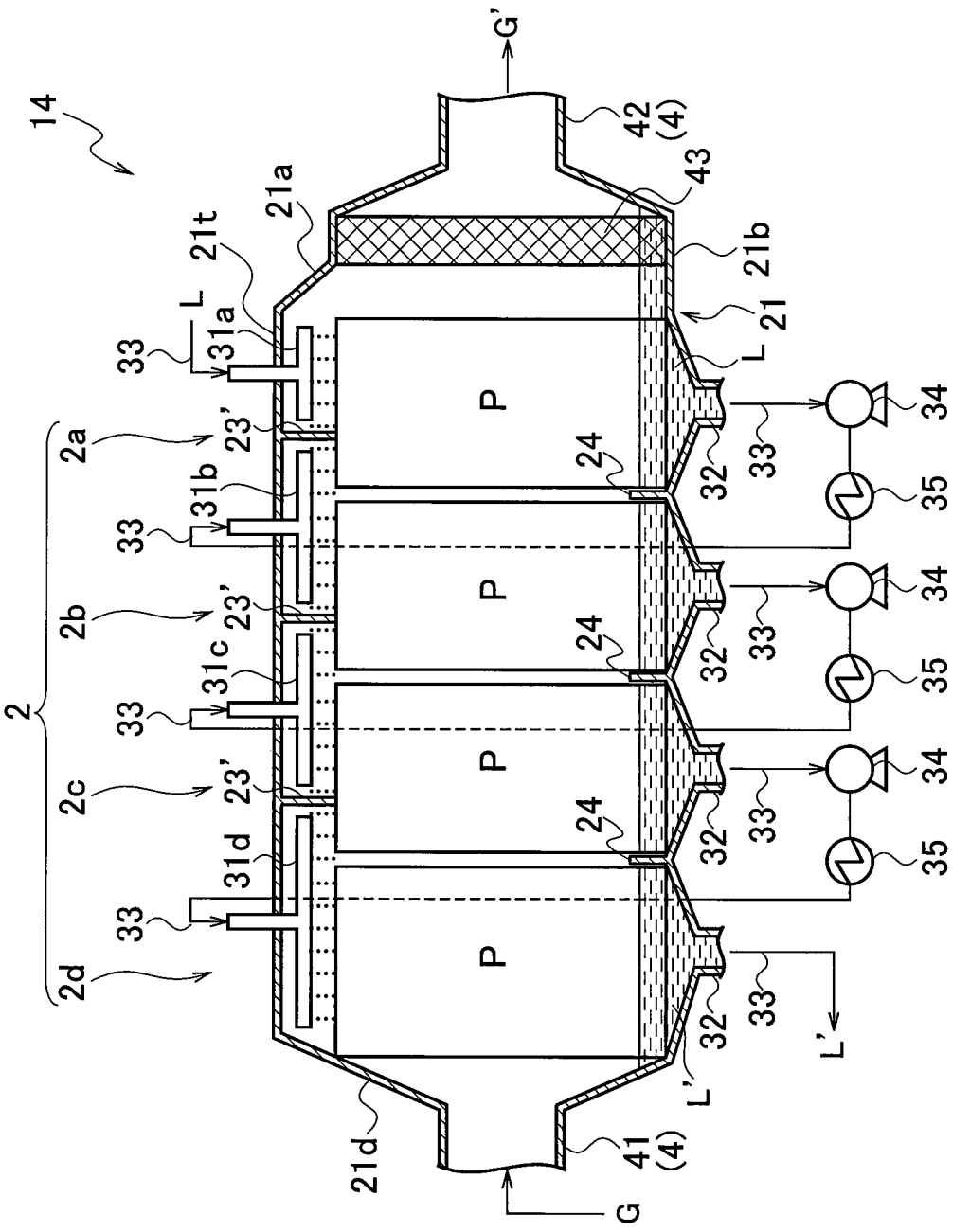

GAS-LIQUID CONTACT APPARATUS

CROSS REFERENCE TO RELATED APPLICATIONS

This application is a continuation application of International Application No. PCT/JP2018/016750, filed on Apr. 25, 2018, the entire contents of which are incorporated by reference herein.

BACKGROUND

Technical Field

The present disclosure relates to a gas-liquid contact apparatus that promotes mass transfer or energy transfer due to contact between gas and liquid, and that is usable as a gas purifier, a gas separator, a cooling device, etc. that separate, removes, or recovers a specific gas component.

Description of the Related Art

Conventionally, a gas separation apparatus employing gas-liquid contact is used in chemical plants, thermal power plants and the like, to separate, remove or recover a specific gas from a gas to be treated, containing various kinds of gases, such as an exhaust gas. For example, in a carbon-dioxide recovering apparatus, a gas containing carbon dioxide gets into contact with an absorbent such as an aqueous monoethanolamine solution, so that carbon dioxide is absorbed and separated. The absorbent that has absorbed carbon dioxide comes into gas-liquid contact while being heated, thereby releasing carbon dioxide into a gas phase, which is recovered. In addition, in a gas purification apparatus for removing a harmful gas component from an exhaust gas and in a gas separation apparatus for separating a specific gas component from a mixed gas, a specific gas component is absorbed into an absorbent through gas-liquid contact.

Generally, an apparatus that performs gas-liquid contact has a packing material for increasing the contact area between an absorbent and a gas, brings the absorbent and the gas into gas-liquid contact on the surface of the packing material, and causes a specific gas component or heat in the gas to be absorbed into the absorbent. Various forms have been proposed as specific embodiments of packing material useful for increasing the gas-liquid contact area.

Irregular packing materials having complicated shapes or structures are complicated to process and load, which significantly increase manufacturing costs and work. For this reason, in the industrial field where a large amount of treatment is performed, use of a packing material having a simple structure is being promoted. For example, International Publication No. WO2013/015415 (Publication Document 1 below) discloses a gas separation apparatus using an expanded metal plate as a packing material. Further, Japanese Patent Application Laid-Open No. 2002-306958 (Publication Document 2 below) discloses a gas-liquid contact apparatus using a gas-liquid contact plate whose surface shape is devised so as to increase the area over which the liquid wets and spreads on the packing material.

In contrast, Japanese Patent Application Laid-open No. 2013-226476 (Publication Document 3 below) discloses a carbon dioxide recovery device having an absorption tower and a regeneration tower in which the gas-liquid contact phase is configured in multiple parts, and a plurality of gas-liquid contact phases are arranged vertically in the absorption tower and the regeneration tower, respectively. With such a vertical multi-stage structure, the contact area between gas and liquid is increased, and the contact efficiency is enhanced.

DOCUMENTS LIST

Publication Document 1: International Publication No. WO2013/015415
Publication Document 2: Japanese Patent Application Laid-open No. 2002-306958
Publication Document 3: Japanese Patent Publication No. 2013-226476

BRIEF SUMMARY

Since the packing material and the gas-liquid contact plate as described in Publication Documents 1 and 2 have a plate-like shape and have a relatively simple structure, loading work into the apparatus is relatively easy. However, the manufacturing and processing of the packing material remains a problem of labor and cost. Further, due to the shape of the surface of the packing material, pressure loss occurs due to flow resistance when gas is supplied, which causes a problem of energy consumption during operation.

In this respect, the use of a flat plate (thin layer material) can reduce the manufacturing and processing cost of the packing material. In this case, a large number of vertical flat plates are arranged in parallel to supply a liquid from above and a gas to the gap between the flat plates so that the liquid flowing down on the flat plate and the gas passing through the gap are brought into contact with each other. In such a form, pressure loss due to gas flow resistance is small, and it is possible to suppress energy consumption during operation to a low level.

However, when a flat plate is used as the packing material, the gas-liquid contact area is likely to decrease due to insufficient wetting of the packing material with the liquid, and it is difficult to increase the contact efficiency. For this reason, conventionally, it is common to use a configuration in which gas-liquid contact phases are vertically stacked in multiple stages, as described in Publication Document 3. However, in such a multi-stage configuration, there is a limit in increasing the height. Further, it is not possible to set so high the volume ratio of the gas-liquid contact phase occupying the inside of the tower.

The present disclosure has come to create in view of the above-described problems. An object of the present disclosure is to provide a gas-liquid contact apparatus capable of realizing good and efficient gas-liquid contact by eliminating wetting defects while suppressing pressure loss in gas-liquid contact.

In order to solve the above problems, the inventors of the present disclosure have studied the structural design of the gas-liquid contact apparatus. As a result, it has been found that configuration of the gas-liquid contact phase in multiple stages is possible while avoiding the problem of durability against gravity load, and good gas-liquid contact can be realized.

According to an aspect of the present disclosure, the gas-liquid contact apparatus, comprises: a gas-liquid contact portion including a plurality of stages which are allocated so as to be arranged in a lateral direction, each of the plurality of stages having a plurality of vertical flat plates arranged in parallel; a liquid supply system which supplies a liquid to the gas-liquid contact portion and causes the liquid to flow along an arrangement of the plurality of stages successively; and a gas supply system which supplies a gas to the gas-liquid contact portion, wherein the liquid supplied by the liquid supply system flows down on the plurality of vertical flat plates in each of the plurality of stages and comes into contact with the supplied gas.

It can be configured so that the gas supplied to the gas-liquid contact portion sequentially flows along the arrangement through the plurality of stages, and that an order in which the liquid supplied by the liquid supply system flows through the plurality of stages is the same as or opposite to an order in which the gas supplied by the gas supply system flows through the plurality of stages. The gas-liquid contact apparatus may be configure to comprise a laterally long container, wherein the plurality of stages are assigned in the laterally long container to be arranged in a longitudinal direction. The laterally long container may have a shape in which the longitudinal direction curves or bends, and the plurality of stages are possibly assigned in the laterally container to be arranged in the longitudinal direction curving or bending. Alternatively, the laterally long container may have a shape in which the longitudinal direction is branched.

The liquid supply system may comprise: a plurality of liquid distributors provided respectively on the upper side of each of the plurality of stages; a plurality of liquid recovery ports provided respectively on the lower side of each of the plurality of stages; and a piping which connects the plurality of liquid distributors and the plurality of liquid recovery ports so that, in the plurality of stages, the liquid recovery port of one stage and the liquid distributor of the stage to which the liquid is next supplied are connected. The liquid supply system is possible to further comprise: at least one heat exchanger provided in the piping for adjusting temperature of the liquid; and a power source for supplying the liquid. The number of the heat exchangers may be one less than the number of the plurality of stages, and the temperature of the liquid can be adjusted for each stage. Further, if configuring it to further comprise: a branch pipe that branches from the piping to connect to the one stage so that a part of the liquid recovered from the one stage returns to the one stage, the flow of liquid can be repeated in the same stage.

The gas supply system may have a gas introduction port communicating with a stage through which the gas first flows, a gas discharge port communicating with a stage through which the gas finally flows, and a demister provided in the gas discharge port.

It may be configured that the plurality of stages are in lateral communication with each other such that the gas supplied by the gas supply system passes through the plurality of stages in the lateral direction, and that the plurality of vertical flat plates in each of the plurality of stages are arranged along a direction in which the gas passes. It is suitable that the gas-liquid contact portion further has a partition wall, at boundary of the plurality of stages, which prevents the gas from flowing over or under the plurality of flat plates.

Alternatively, the gas supply system may have configuration to further comprise a guide wall which guides the gas so that gas flow in the plurality of stages alternately repeats rising and falling for each stage. Or, the gas supply system may further comprise a guide wall which forms a communication passage to guide the gas from an upper part of one of the plurality of stages to a lower part of a stage through which the gas flows next. Thereby, such configuration is given that the gas flows so as to rise between the flat plates in each of the plurality of stages.

Alternatively, the liquid supply system may be configured to comprise: a plurality of liquid distributors provided respectively on the upper side of each of the plurality of stages to supply the liquid to the plurality of flat plates; a plurality of liquid recovery ports provided respectively on the lower side of each of the plurality of stages to collect the liquid flowing down the plurality of flat plates; a piping which connects the plurality of liquid distributors and the plurality of liquid recovery ports so that, in each of the plurality of stages, the liquid recovered from the liquid recovery port is returned to the liquid distributor; and a partition wall provided at the boundary between the plurality of stages, having a height that regulates an amount of liquid remaining in one stage to a predetermined amount in the plurality of stages, and that excess liquid exceeding the predetermined amount flows to the stage to which the liquid is next supplied. Or, in regard to the liquid supply system, while configuring a piping which connects the plurality of liquid distributors and the plurality of liquid recovery ports so that, in the plurality of stages, the liquid recovery port of one stage and the liquid distributor of the stage to which the liquid is next supplied are connected, such an arrangement is also possible that, in each of the plurality of stages other than the stage to which the liquid is first supplied, the liquid distributor in one stage is arranged to possibly supply the liquid across the two stage of the one stage and the preceding stage.

Since the gas-liquid contact phase in which the pressure loss in gas-liquid contact is suppressed can be configured in multiple stages while avoiding the problem of gravity load, it is possible to provide a gas-liquid contact apparatus which has good energy efficiency during operation and can realize good gas-liquid contact and efficient transfer of components or energy.

BRIEF DESCRIPTION OF DRAWINGS

FIG. 1A is a longitudinal sectional view schematically showing one embodiment of a gas-liquid contact apparatus, and FIG. 1B is a sectional view taken along a line A-A in FIG. 1A.

FIG. 7 is a longitudinal sectional view showing still another modified example of the gas-liquid contact apparatus.

DETAILED DESCRIPTION OF EMBODIMENTS

Figure 2A:
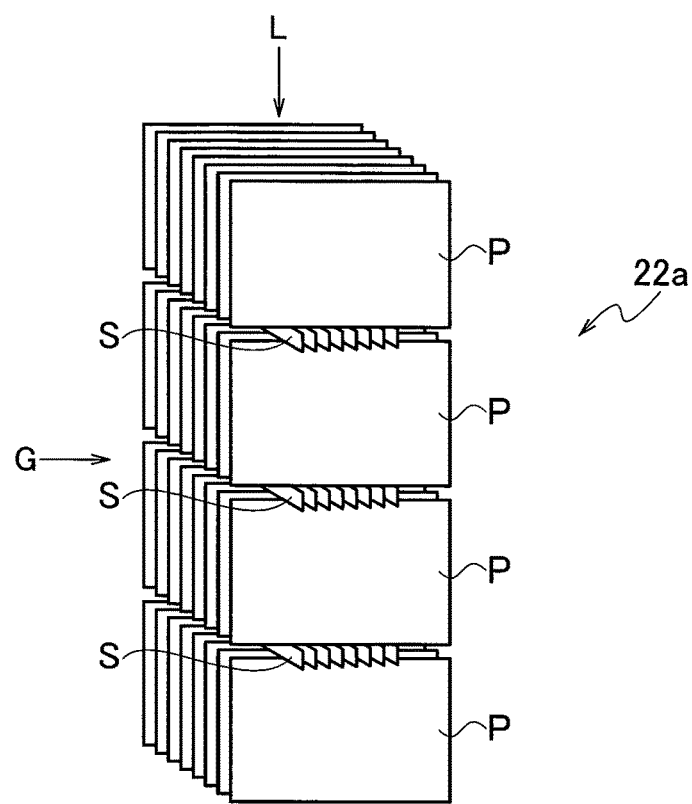
FIG. 2A and FIG. 2B are schematic diagrams for illustrating configuration of a packing material in a gas-liquid contact portion.

Description for embodiments of the present disclosure will follow, with reference to the accompanying drawings. Note that dimensions, materials, concrete numerical values and the like indicated in the embodiments are only examples for facilitating understanding the contents of the present disclosure and do not limit the present disclosure. Moreover, in the description and the drawings of the present disclosure, elements having substantially an identical function and configuration are shown with denoted by identical reference numerals, and overlapped description will be omitted. Elements not directly related to the present disclosure are not illustrated.

The gas-liquid contact phase having a plurality of vertical flat plates arranged in parallel as the packing material has small pressure loss due to gas flow resistance. Therefore, even if a large number of gas-liquid contact phases are stacked and configured in multiple stages, it is possible to suppress the energy consumption in the gas-liquid contact treatment to a low level. However, in the conventional multi-stage structure that is vertically stacked, it is limited to increase the number of stages and increase the gas-liquid contact efficiency. The present disclosure solves the problem related to the height limit, by arranging a plurality of gas-liquid contact phases in the lateral direction to configure a multi-stage structure. Hereinafter, an embodiment of a gas-liquid contact apparatus will be specifically described with reference to the drawings. In order to facilitate understanding of the drawings, the piping system for supplying the liquid is simplified and shown by a solid line.

FIG. 1A and FIG. 1B show an embodiment of a gas-liquid contact apparatus. In FIG. 1A and FIG. 1B, a gas-liquid contact apparatus 1 has a gas-liquid contact portion 2, a liquid supply system 3, and a gas supply system 4, and is configured in a lateral multi-stage structure. Specifically, the gas-liquid contact apparatus 1 has a laterally long container 21 elongated in the horizontal direction, and the gas-liquid contact portion 2 is formed in the container 21. The container 21 has a top plate 21t, a bottom plate 21b, and a pair of side walls 21s along the longitudinal direction, and end walls 21a and 21d at both ends in the longitudinal direction. The shape of the container 21 is a substantially rectangular column whose cross section perpendicular to the longitudinal direction is substantially rectangular. The gas-liquid contact portion 2 formed in a horizontally long space in the container 21 has a plurality of stages 2a, 2b, 2c, 2d that are allocated to be laterally arranged along the longitudinal direction of the container 21. In each of the plurality of stages, a plurality of vertical flat plates P are provided as a packing material 22 to be arranged in parallel at intervals. Each stage of the gas-liquid contact portion 2 corresponds to a conventional one-stage gas-liquid contact phase, and in each stage, a liquid film is formed on the flat plates P by supplying a liquid L from above to the plurality of vertical flat plates P to flow down. Note that, in this embodiment, the gas-liquid contact portion 2 has four stages, but the number of stages to be allocated may be any number of tow or more. It may be assigned to an appropriate number of stages, as needed. Further, in the gas-liquid contact portion 2 of this embodiment, the plurality of stages 2a, 2b, 2c, 2d are allocated substantially evenly, and the flat plates P having the same size are used for the packing material 22. However, it is also possible to change the lengths of the stages in the longitudinal direction to be different, if necessary.

The gas-liquid contact apparatus 1 further comprises a liquid supply system 3 and a gas supply system 4. The liquid supply system 3 supplies the liquid L to the gas-liquid contact portion 2 to sequentially flow through the plurality of stages 2a, 2b, 2c, 2s along the arrangement. The gas supply system 4 supplies a gas G to the gas-liquid contact portion 2 to sequentially flow through the plurality of stages 2a, 2b, 2c, 2s along the arrangement. The liquid supply system 3 includes a plurality of liquid distributors 31, a plurality of liquid recovery ports 32, and a piping 33 that connects the plurality of liquid distributors 31 and the plurality of liquid recovery ports 32. The plurality of liquid distributors 31 are provided on the upper side of each of the plurality of stages 2a, 2b, 2c, 2d. The plurality of liquid recovery ports 32 are provided on the lower side of each of the plurality of stages. The piping 33 is configured such that, in the plurality of stages, the liquid recovery port 32 of one stage and the liquid distributor 31 of the stage to which the liquid is next supplied are connected. The bottom plate 21b of the container 21 is formed in a concave shape that is inclined so that the center thereof becomes the lowest in each stage, and the liquid recovery port 32 is connected to the bottom of the concave shape. The liquid supplied to the liquid distributor 31 in the stage 2a through the piping 33 is supplied to the upper side of the flat plates P from the liquid distributor 31, flowing down along the surface of the flat plates P, and is stored at the bottom portion and discharged from the liquid recovery port 32 to the piping 33. Pumps 34 are arranged on the piping 33 respectively between the liquid recovery port 32 of one stage and the liquid distributor 31 of the next stage, and act as a power source for supplying the liquid transfer energy. Since the liquid is sent from the liquid recovery port 32 of one stage to the liquid distributor 31 of the next stage by driving the pump 34, the liquid at the bottom of the stage 2a is supplied to the liquid distributor 31 of the next stage 2b. Similarly, since the supply to the subsequent stages 2c and 2d is sequentially performed, the liquid L sequentially flows through the plurality of stages 2a, 2b, 2c and 2d. Since the flow rate of the liquid flowing through the piping 33 can be adjusted by controlling the drive of the pumps 34, the amount of the liquid stored at the bottom of each stage can be adjusted by controlling the pumps 34. However, if necessary, a flow rate adjusting valve may be installed in the piping 33 and flow rate of the liquid may be adjusted using it, by which the adjustment accuracy is improved.

The liquid distributor 31 for supplying the liquid L to the packing material 22 can be appropriately selected to use from the commonly used ones. Good gas-liquid contact treatment can be carried out using a liquid distributor having a drip point density (liquid supply points per area) of about 100 to 3,000 points/m$^2$. It is preferable to use a liquid distributor having a drip point density of 500 to 3,000 points/m$^2$. The liquid distributor is generally composed mainly of a distribution pipe for guiding and distributing the liquid to each drip point, and a device for dripping the liquid such as an opening, a thin tube nozzle, a guide claw, etc. is provided at each drip point of the distribution pipe. Any of these types of liquid distributors can be used. The liquid supplied to the liquid distributor is distributed to each drip point through the distribution pipe, and falls freely to be supplied to the packing material 22.

Further, heat exchangers 35 capable of adjusting the temperature of the liquid are arranged on the piping 33. Therefore, by supplying a heat medium or a refrigerant to the heat exchangers 35, the liquid adjusted to the temperature suitable for the gas-liquid contact treatment can be supplied to each stage. Therefore, the temperature change of the liquid caused by the gas-liquid contact while the liquid sequentially flows from the stage 2a to the stage 2d can be eliminated by using the heat exchanges 35. In the embodiment of FIG. 1A, the number of heat exchangers 35 installed in the piping 33 is one less than the number of stages (number of stages minus 1), and the temperature of the liquid is adjusted for each stage. In the lateral multi-stage structure, the temperature of the liquid supplied to each stage can be easily adjusted by disposing the heat exchangers using the piping 33, and it is possible to suitably control the temperature of the gas-liquid contact portion having five or more stages, which may be difficult in the vertical multi-stage structure. However, the heat exchanger 35 may be used depending on the necessity of heating or cooling, and the temperature of the liquid can be adjusted by using at least one heat exchanger. That is, it may be possible to reduce or omit the heat exchangers 35 depending on the situation.

On the other hand, as the gas supply system 4, the gas-liquid contact apparatus 1 includes a tubular gas introduction port 41 communicating with a stage 2d through which the gas first flows, and a gas discharge port 42 communicating with a stage through which the gas finally flows. The gas introduction port 41 is provided in the center of the end wall 21d of the container, and the gas discharge port 42 is provided in the center of the end wall 21a. A demister 43 is installed at the gas discharge port 42 in order to prevent the minute droplets from being entrained and discharged together with the gas G discharged from the gas discharge port 42. As the demister 43, a mesh-like or porous member such as a wire mesh or a perforated plate may be used, and it may be possible to select and use an appropriate one having a suitable opening size from those generally used as a demister.

In the configuration of FIG. 1A, when the liquid L and the gas G are supplied to the gas-liquid contact portion 2 of the gas-liquid contact apparatus 1 by the liquid supply system 3 and the gas supply system 4, the supplied liquid L flows down the plurality of vertical flat plates P, respectively, in each of the plurality of stages 2a, 2b, 2c, 2d. At the same time, the supplied gas G flows laterally between the flat plates P and intersects, so that the liquid L and the gas G contact with each other. In this embodiment, the order in which the liquid L supplied by the liquid supply system 3 flows through the plurality of stages 2a, 2b, 2c, 2d is the reverse of the order in which the supplied gas G flows through the plurality of stages 2a, 2b, 2c, 2d. Therefore, by supplying the liquid L and the gas G, countercurrent gas-liquid contact is performed as the entire gas-liquid contact portion 2. If modifying the embodiment of FIG. 1A to reverse the installation positions of the gas introduction port 41 and the gas discharge port 42, the liquid L and the gas G are supplied to the plurality of stages in the same order. Therefore, it is possible to carry out gas-liquid contact of parallel flow type. Moreover, in the embodiment of FIG. 1A and embodiments described later, the supply of the gas G is performed using the flow pressure of the gas G supplied from the outside, and a power source for supplying gas is not particularly described. However, the gas supply system 4 may use a gas feeding means such as a pump or a fan as needed.

The flow resistance of the gas G while the gas G and the liquid L come into contact with each other affects the energy consumption during operation. The wetting area (gas-liquid contact area) per unit volume, the gas flow rate, and the gas flow resistance in the packing material 22 change depending on the thickness and spacing of the flat plates P. Therefore, in consideration of these, the number of parallel flat plates P is set to make a suitable flow space. It is possible to secure the distance between the flat plates P, for example, with intervening spacers. The dimensions and the installation position of the spacer may be adjusted appropriately so as not to hinder the flow of the gas G and the liquid L. An outer frame may be used to collectively integrate the plurality of flat plates P as a unit, and the work of loading the packing material 22 becomes easy when the outer frame fix the upper and lower ends of the plurality of flat plates P so that the flat plates are arranged side by side through the spacers.

Partition walls 23, 24 are provided to stand vertically from the top plate 21t and the bottom plate 21b of the container 21 at the boundary positions of the plurality of stages 2a, 2b, 2c, 2d of the gas-liquid contact portion 2. However, the height of the partition walls 23, 24 is small, and each of the boundary planes between the plurality of stages 2a, 2b, 2c, 2d is almost entirely open. That is, the plurality of stages 2a, 2b, 2c, 2d communicate with each other in the lateral direction. In FIG. TA, when supplying the gas G from the gas introduction port 41, the gas G flows through the gas-liquid contact portion 2 along the longitudinal direction of the container 21 and sequentially passes from the stage 2d to the stage 2a. In each of the plurality of stages 2a, 2b, 2c, 2d, the plurality of vertical flat plates P are arranged parallel to the longitudinal direction of the container 21 to be along the direction in which the gas G passes. Therefore, the gas G supplied by the gas supply system passes straight through the space between the flat plates P and the space between the flat plate P and the side of the container 21, and it can penetrate the plurality of stages 1a, 2b, 2c, 2d linearly in the lateral direction. Therefore, the pressure loss of the gas G due to the flow resistance is suppressed low.

The partition wall 23 on the top plate 21t side serves to prevent the gas G from escaping from the space between the flat plates P to flow above it. Therefore, the height of the partition wall 23 is set so that at least the lower end thereof reaches the upper ends of the flat plates P, and it is provided to contact the corners of the flat plates P. However, the excessive height increases the flow resistance of the gas G. On the other hand, the partition wall 24 on the bottom plate 21b side serves to prevent the flow of the gas G from escaping below the flat plates P. When the liquid flowing down from the flat plates P and stored at the bottom has a liquid level reaching the lower ends of the flat plates P, that is, when the lower ends of the flat plates P contact the stored liquid, the flow of the gas G can be surely prevented from escaping the flat plates P and moving downward. Therefore, the height of the partition wall 24 may be set higher than the lower ends of the flat plates P arranged in the respective stages, and to the height at which the liquid is reliably stored. When using a spacer that properly fixes the distance between the flat plates P, the partition walls 23, 24 may be used to install the spacer. Alternatively, a shallow vertical groove having a width capable of fitting the side end of the flat plate P may be formed on the side surface of the partition walls 23, 24. Then the groove can hold and position the side end of the flat plate P in it, so that it functions as a spacer.

In the embodiment of FIG. 1A, a plurality of flat plates P are arranged, individually, on each of the plurality of stages 2a, 2b, 2c, 2d. However, since the plurality of stages 2a, 2b, 2c, 2d are in lateral communication with each other, it is possible to make a modification such that the plurality of stages 2a, 2b, 2c, 2d share a common flat plate. That is, a plurality of flat plates having a length equal to the length of the gas-liquid contact portion 2 in the longitudinal direction (=the total length of the plurality of stages 2a, 2b, 2c, 2d in the longitudinal direction) may be arranged side by side so as to penetrate the plurality of stages 2a, 2b, 2c, 2d.

Therefore, as each of the plurality of vertical flat plates P, a horizontally long flat plate that is integrally continuous through the plurality of stages 2a, 2b, 2c, 2d can be used. On this occasion, if necessary, notches for fitting the partition walls 23, 24 may be formed at the upper end and the lower end of each flat plate, so that the plates can be properly installed. Alternatively, a plurality of cutouts may be formed in the lower end of the partition wall 23 and the upper end of the partition wall 24, and the flat plates may be fitted into the cutouts. In this case, the partition walls 23, 24 and the cutouts can also act as a positioning means for the flat plates.

Each stage of the gas-liquid contact portion 2 in the embodiment of FIG. 1A is configured by using a packing material having a single-tier structure composed of a plurality of flat plates arranged parallel in a row. However, a packing material having a multi-tier structure may be used within an allowable range in terms of strength of the packing material and the like. For example, as shown in FIG. 2A, it is possible to use a packing material 22a having a multi-tier structure (four tiers in the figure) in which parallel flat plates are stacked. In this case, a supporting member for supporting the upper-tier flat plates interposes between each two tiers. In the example of FIG. 2A, a plurality of elongated flat plate pieces S are arranged to bridge the flat plates P in the perpendicular direction with respect to the flat plates P, and are interposed between the upper and lower tiers, which are used as a support member. Such a flat plate piece S has a function of redistributing the liquid flowing down from the flat plates P of the upper tire in a direction perpendicular to the flat plate P. By redistributing the liquid, it is suitable and possible to prevent the reduction of the wet area due to poor wetting. However, since the flat plate pieces S causes a gas flow resistance, it is preferable to use a flat plate piece having a small height so that the area ratio occupied by the flat plate pieces S in the plane perpendicular to the gas flow is less than 20%. Alternatively, instead of bridging such flat plate pieces S, a thin perforated plate or mesh plate may be used to place on the flat plates P. Then it is possible to suppress the gas flow resistance to a low level, while functioning as a supporting member to load the flat plates P stably.

Figure 2B:
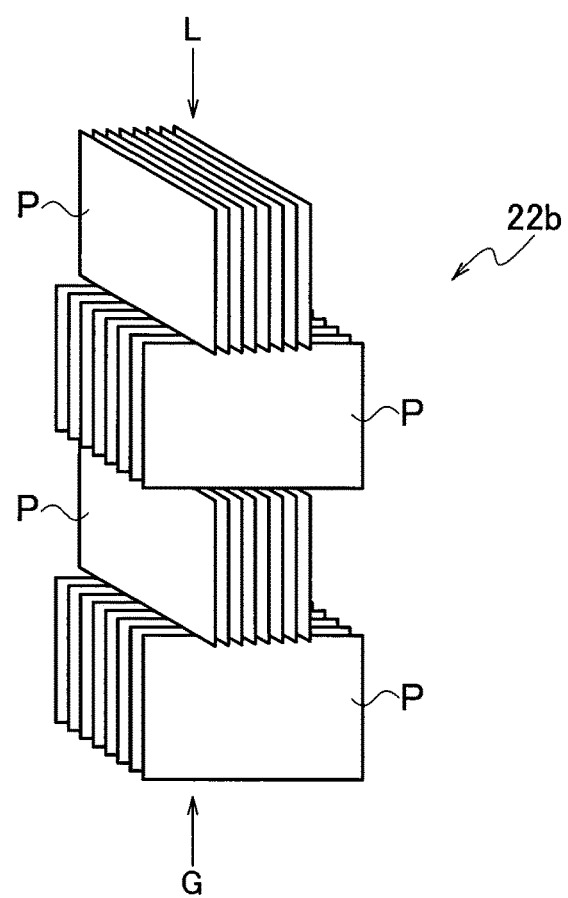

In the gas-liquid contact apparatus 1 of FIG. 1A, when the packing material 22a of FIG. 2A is installed in each stage, the gas flow direction is the lateral direction (horizontal direction) and perpendicularly intersects the liquid flow-down direction (vertical direction). However, the packing material 22a is also usable in a form in which the gas G flows in the vertical direction, and it is possible, by using the packing material 22a, to perform a parallel flow type or counter flow type gas-liquid contact in each stage. On the other hand, the flat plates P can be stacked so that the flat plates P on the upper tier side and the flat plates P on the lower tier side are perpendicular to each other in a twisted position, as shown in FIG. 2B. Then the packing material 22b having a multi-tier structure can be formed without interposing a supporting member. This packing material 22b also has a function of redistributing the liquid flowing down from the upper-tier flat plates P in a direction perpendicular to the lower-tier flat plates P. In the packing material 22b, though the flow resistance is high in the horizontal gas flow, the gas G in the vertical gas flow easily passes between the flat plates P and the flow resistance is small. Therefore, the packing material 22b is suitable for performing parallel flow type or counter flow type gas-liquid contact in each stage. A gas-liquid contact apparatus having a structure capable of parallel flow type or counter flow type gas-liquid contact in each stage will be described below.

Figure 3:
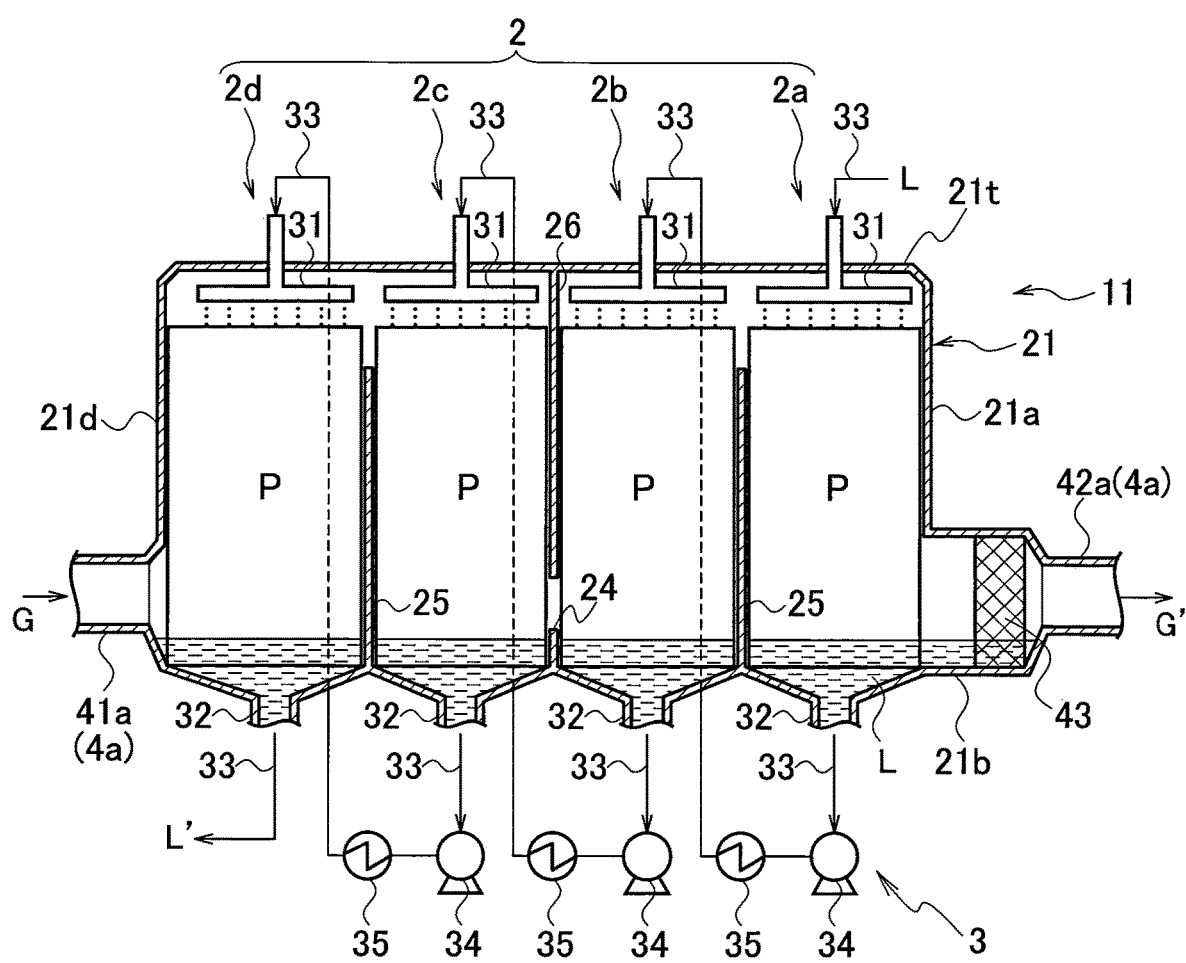
FIG. 3 is a longitudinal sectional view schematically showing another embodiment of the gas-liquid contact apparatus.

FIG. 3 shows an embodiment of a gas-liquid contact apparatus for performing gas-liquid contact of a parallel flow type or a counter flow type. The gas-liquid contact apparatus 11 shown in FIG. 3 is described in a form in which the packing material 22 similar to that shown in FIG. 1A is loaded in each stage of the gas-liquid contact portion 2. However, as will be understood from the above, either or both the packing materials 22a and 22b of FIG. 2A and FIG. 2B may be loaded into the gas-liquid contact apparatus 11 and used.

The gas-liquid contact apparatus 11 of FIG. 3 has the same liquid supply system 3 as the gas-liquid contact apparatus 1 of FIG. 1A. Similarly, four stages 2a, 2b, 2c, 2d are assigned to the gas-liquid contact portion 2, and the liquid L is sequentially supplied from the stage 2a of the gas-liquid contact portion 2 to the stage 2d through the piping 33 of the liquid supply system 3. In each stage, the liquid L supplied from the liquid distributor 31 flows down on the flat plates P, is recovered from the liquid recovery port 32, and is sent to the next stage by the pump 34. During this time, the temperature is adjusted by the heat exchanger 35. On the other hand, the gas supply system 4a is configured such that the flow of the gas G alternately repeats rising and falling for each stage.

Specifically, in FIG. 3, a part of the partition walls 24 in FIG. 1A is replaced with a guide wall 25. The position where the partition walls 24 is left and the position where the guide wall 25 is replaced are alternately arranged at the boundaries of the plurality of stages. At the boundary where the guide wall 25 is provided, the partition wall 23 of FIG. 1A is removed, and at the boundary where the partition wall 24 remains, the partition wall 23 of FIG. 1A is replaced with a guide wall 26. Therefore, the guide wall 25 and the guide wall 26 are alternately placed at the boundaries of the plurality of stages 2a, 2b, 2c, 2d of the gas-liquid contact portion 2. The guide wall 25 extends vertically upward from the bottom plate 21b of the container 21 and its height is set to leave a predetermined space between the upper end thereof and the top plate 21t of the container 21. Therefore, the guide wall 25 blocks most of the boundary between two adjacent stages, and the two stages are partially communicated by the space above the guide wall 25. The guide wall 26 extends downward from the top plate 21t of the container 21 in the vertical direction, and its height is set to leave a predetermined space between the lower end thereof and the upper end of the partition wall 24. Therefore, the guide wall 26 blocks most of the boundary between two adjacent stages, and the two sections are partially communicated by the space below the guide wall 26.

Since the guide wall 25 and the guide wall 26 are alternately provided at the boundaries of the plurality of stages 2a, 2b, 2c, 2d, the spaces that connect two adjacent stages to each other are alternately formed on the upper side and the lower side of the gas-liquid contact portion 2. Therefore, the gas G supplied from the gas introduction port 41a meanders up and down by alternately repeating ascending and descending for each stage while flowing through the gas-liquid contact portion 2, and then discharged from the gas discharge portion 42a. That is, while the gas-liquid contact form between the liquid L and the gas G as the entire gas-liquid contact portion 2 is counter flow-type gas-liquid contact, counter flow gas-liquid contact and parallel flow gas-liquid contact are alternately performed in each stage.

In the gas-liquid contact apparatus 1 of FIG. 1A, since the gas G flows in the lateral direction, the gas introduction port 41 and the gas discharge port 42 are provided at the centers of the end walls 21d and 21a, respectively. That is, the gas flow from the stage 2d at the most upstream position to the stage 2a at the most downstream portion is configured to be as uniform as possible. On the other hand, the gas-liquid contact apparatus 11 of FIG. 3 has a structure in which the gas G rises in the stage 2d at the most upstream position of the gas flow. Therefore, the gas introduction port 41a is provided at the lower end of the end surface of the stage 2d (the end wall 21d of the container 21), in order to supply the gas G from below to the stage 2d. Further, since it is in such structure that the gas G in the stage 2a at the most downstream position descends, also the gas discharge port 42a is provided at the lower end of the end surface (end wall 21a) in order to discharge the gas G from below the stage 2a. If the arrangement of the guide walls 25 and 26 is changed to be reversed, the rising/falling structure of the gas G is reversed. Therefore, in that case, it may be modified such that the gas introduction port 41a and the gas discharge port 42a are provided at the upper ends of the end walls 21a and 21d, in order to supply and discharge the gas G from above. Further, since the number of stages of the gas-liquid contact portion 2 in the embodiment of FIG. 3 is an even number, the arrangement of the gas introduction port 41a coincides with the installation height of the gas discharge port 42a. If changing the number of stages in the gas-liquid contact portion 2 to an odd number, one of the gas introduction port 41a and the gas discharge port 42a is arranged at the upper end of the end wall, and the other is arranged at the lower end. That is, the installation heights of the gas introduction port 41a and the gas discharge port 42a may be appropriately changed according to the flow of the gas G guided by the guide walls 25 and 26. If shallow vertical grooves capable of holding the side edges of the flat plates P are provided on the side surfaces of the guide walls 25 and 26, they make possible the positioning of the flat plates P. Then it is possible to impart a function as a spacer to the guide walls 25 and 26, similarly to the partition walls 23 and 24 of FIG. 1A.

Figure 4:
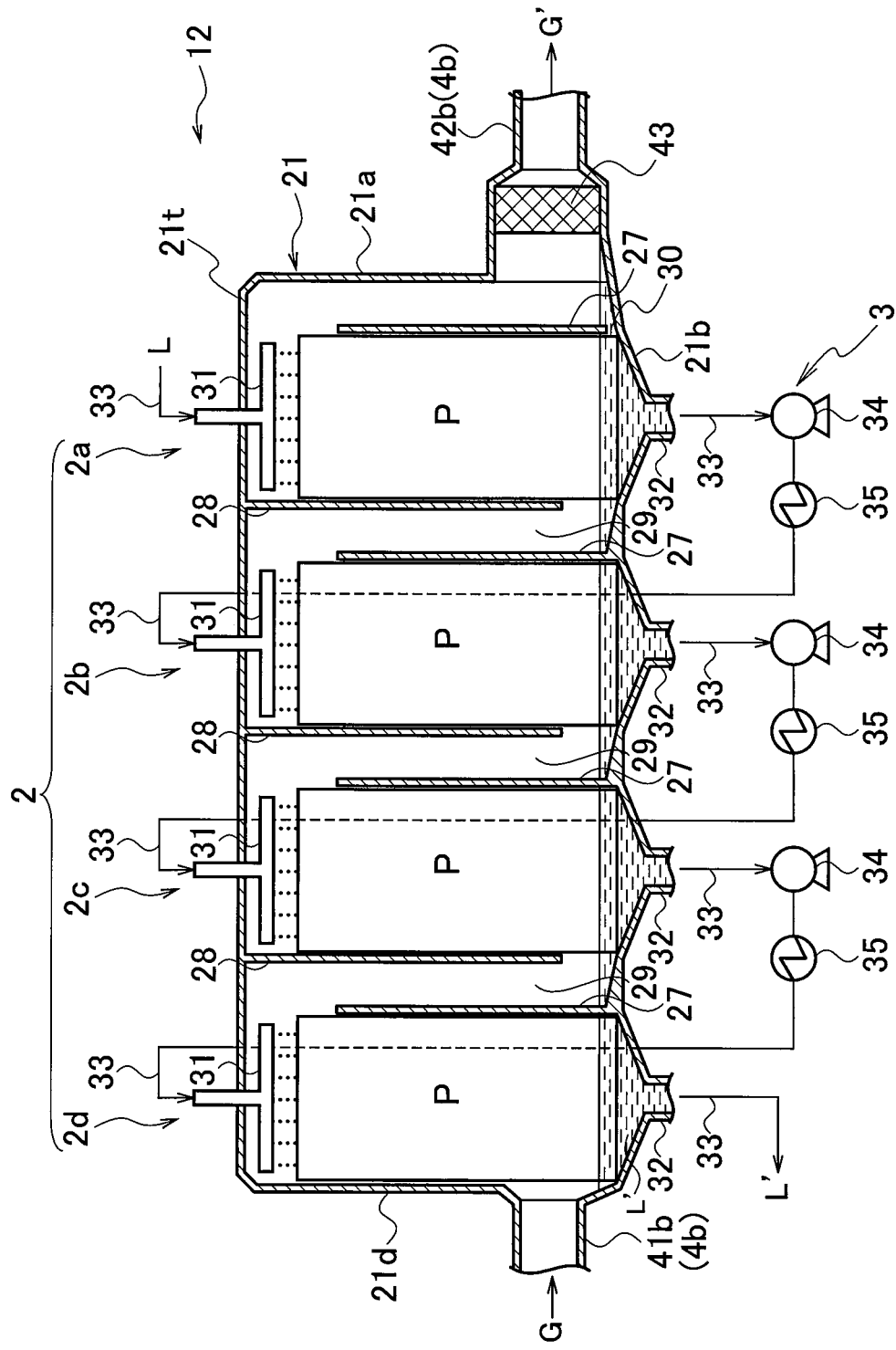
FIG. 4 is a longitudinal sectional view schematically showing still another embodiment of the gas-liquid contact apparatus.

FIG. 4 shows an embodiment of a gas-liquid contact apparatus that performs counter flow gas-liquid contact in all stages of the gas-liquid contact portion. The gas-liquid contact apparatus 12 shown in FIG. 4 also is shown in a form in which the same packing material 22 as in FIG. 1A is loaded in each stage of the gas-liquid contact portion 2. However, as described above, either or both of the packing materials 22a and 22b shown in FIG. 2A and FIG. 2B may be appropriately distributed and used to load in each stage of the gas-liquid contact portion.

The gas-liquid contact apparatus 12 of FIG. 4 has the liquid supply system 3 that is same as of the gas-liquid contact apparatus 1 of FIG. 1A. Similarly, the gas-liquid contact portion 2 are assigned with four stages 2a, 2b, 2c, 2d, and the liquid L is sequentially supplied from the stage 2a of the gas-liquid contact portion 2 toward the stage 2d through the piping 33 of the liquid supply system 3. In each stage, the liquid L supplied from the liquid distributor 31 flows down on the flat plates P, which is recovered from the liquid recovery port 32 and is sent to the next stage by the pump 34. During this time, the temperature is adjusted by the heat exchanger 35. On the other hand, the gas supply system 4b is configured in such a manner that the flow of the gas G rises in all stages of the gas-liquid contact portion 2 to make counter flow gas-liquid contact.

Specifically, in FIG. 4, parallel guide walls 27 and 28 are provided at each of the boundaries of the plurality of stages 2a, 2b, 2c, 2d, and a communication passage 29 having a constant width is formed between the guide wall 27 and the guide wall 28. The guide wall 27 extends vertically upward from the bottom plate 21b of the container 21, and its height is set to provide a predetermined space between the upper end thereof and the top plate 21t of the container 21. The guide wall 28 extends vertically downward from the top plate 21t of the container 21, and its height is set to provide a predetermined space between the lower end thereof and the bottom plate 21b of the container 21. The communication passage 29 communicates with both adjacent stages in the space between the guide wall 27 and the top plate 21t and in the space between the guide wall 28 and the bottom plate 21b. Therefore, the gas G supplied from the gas introduction port 41b and rising between the flat plates P of the stage 2d is guided from above the guide wall 27, through the communication passage 29, to the lower part of the stage 2c through which the gas flows next. Similarly, the gas supply from below and the gas discharge from above are repeated in each of the subsequent stages. Meanwhile, the gas G rising between the flat plates P and the liquid L flowing down are brought into gas-liquid contact in each stage. A communication hole 30 is provided at the base of the guide wall 27 provided on the gas discharge port 42b side of the stage 2a. Thereby, when the liquid L supplied from the liquid distributor 31 of the stage 2a flows out to the gas discharge port 42b side, the liquid L possibly flows to the bottom of the stage 2a.

In the embodiment of FIG. 4, the communication passage 29 is formed such as to connect the upper part of the upstream stage and the lower part of the downstream stage of the gas flow. Thus, the gas introduction port 41a is provided at the lower end of the end plane (end wall 21d) of the stage 2d at the most upstream position. On the other hand, the stage 2a at the most downstream position of the gas flow is blocked by the guide wall 27 on the downstream side of the flat plates P, and the gas G discharged from the upper part of the stage 2a descends in the space between the guide wall 27 and the end wall 21a. Therefore, the gas discharge port 42b is provided at the lower end of the end wall 21a. However, this embodiment may be modified so that the guide wall 27 on the downstream side of the stage 2a is omitted and the space between the end wall 21a and the flat plates P is eliminated. In that case, the gas discharge port 42b is provided at the upper end of the end wall 21a, and the gas G discharged from the upper part of the stage 2a is discharged from the upper part of the container 21.

Moreover, if the embodiment of FIG. 4 is changed to reverse the arrangement of the gas introduction port 41b and the gas discharge port 42b, the gas G flows to descend between the flat plates P in each stage of the gas-liquid contact portion 2. Thus, a parallel flow-type gas-liquid contact is performed between the liquid L and the gas G. In this case, the gas G flows from the stage 2a to the stage 2d. Therefore, also in the gas-liquid contact portion 2 as a whole, the contact between the gas G and the liquid L is a parallel flow-type gas-liquid contact. Alternatively, it is possible to change the embodiment of FIG. 4 such that the gas G descends each stage of the gas-liquid contact portion 2 depending on the installation position of the guide walls 27 and 28. Specifically, if reversing the installation positions of the guide wall 27 and the guide wall 28, the communication passage 29 is changed to connect the lower part of the upstream stage and the upper part of the downstream stage of the gas flow. As a result, in each stage, the descending gas G and the liquid L flowing down from the liquid distributor 31 are brought into parallel-flow gas-liquid contact. In this modification, the gas introduction port 41b may be provided at the upper end of the end wall 21d. If shallow vertical grooves capable of holding the side edges of the flat plates P are formed on the side surfaces of the guide walls 27 and 28, positioning of the flat plates P is made possible. Thus the guide walls 27 and 28 can be provided with a function as a spacer, similarly to the partition walls 23 and 24 in FIG. 1A.

In the gas-liquid contact apparatus of FIG. 1A, since the gas G flows in the lateral direction, the liquid distributor 31 located above the packing material does not participate in the pressure loss of gas supply. Further, in the gas-liquid contact apparatuses 11 and 12 of FIG. 3 and FIG. 4, it does not participate so much to the pressure loss of the gas supply since the flow of the gas G meanders near the liquid distributor 31. Therefore, in the gas-liquid contact apparatuses in which the gas-liquid contact portion 2 is horizontally oblong, there is an advantage that consideration of the pressure loss due to the liquid distributor 31 is not necessary.

To the gas-liquid contact apparatuses 1, 11 and 12 described above, it is possible to apply various modifications in order to set a suitable gas-liquid contact condition depending on the situation. Hereinafter, some modified examples will be described.

Figure 5:
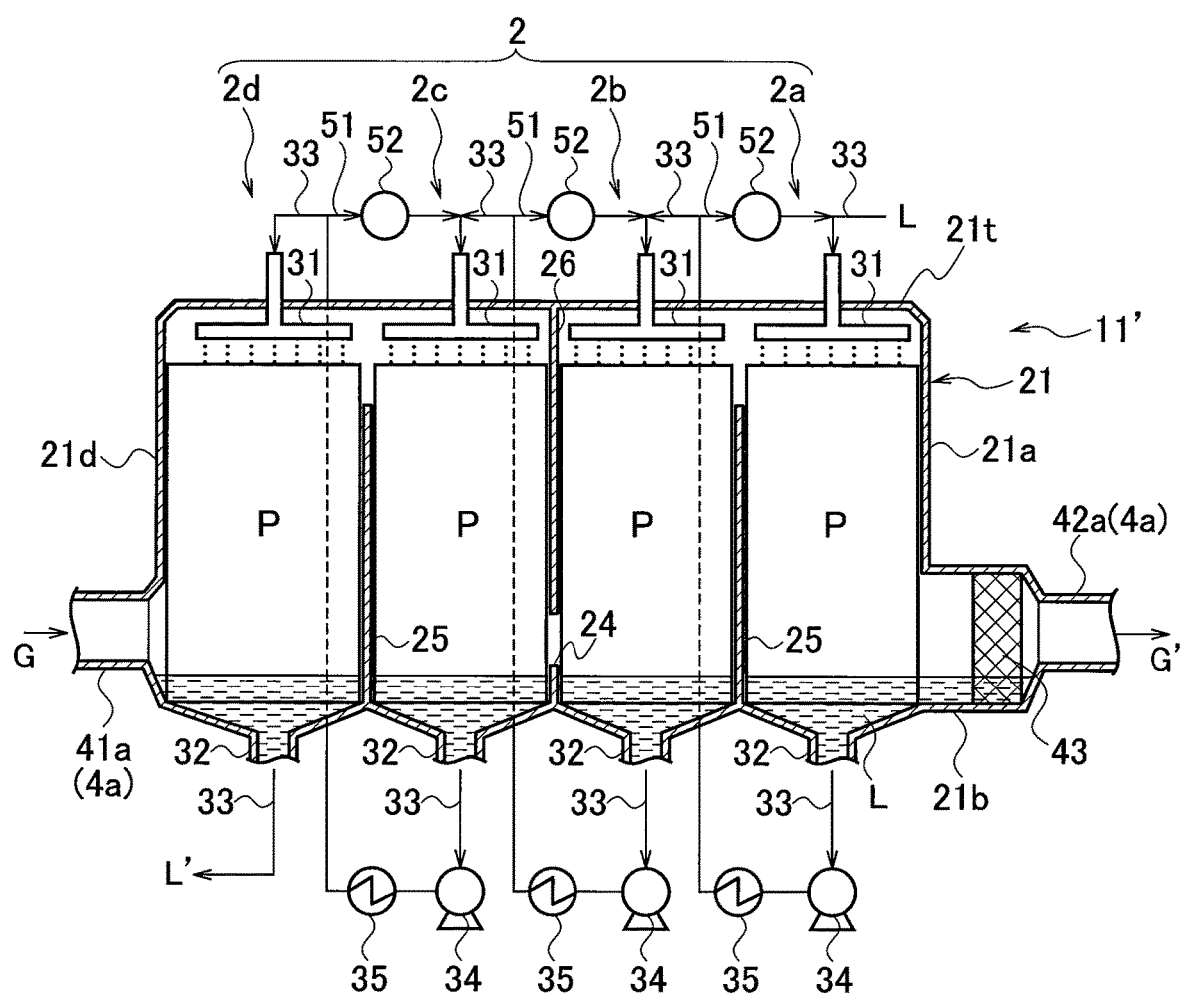
FIG. 5 is a longitudinal sectional view showing a modified example of the gas-liquid contact apparatus.

In the gas-liquid contact apparatus 1, 11 and 12 described above, the number of times the liquid supplied to the apparatus flows down the flat plates P corresponds to the number of stages assigned to the gas-liquid contact portion 2. However, if configured as a gas-liquid contact apparatus 11' shown in FIG. 5, for example, a part of the liquid repeatedly flows through the same stage. Specifically, a branch pipe 51, which branches from the piping 33 and connects with the liquid distributor of the original stage, is provided so that a part of the liquid recovered from the liquid recovery port 32 of one stage is not supplied to the next stage and is returned to the original stage. Therefore, the time during which the liquid L stays in the apparatus becomes longer, and the contact time between the liquid L and the gas G is extended. That is, an effect similar to that of increasing the number of stages to be allocated is obtained. By providing a flow rate-adjusting valve 52 in the branch pipe 51, it becomes possible to adjust the ratio of the liquid that returns to the original stage. As the ratio of the liquid that returns increases, the time that the liquid L stays in the apparatus becomes longer. FIG. 5 shows a modified example in which the branch pipe 51 and the flow rate-adjusting valve 52 are provided in the gas-liquid contact apparatus 11 of FIG. 3. However, it is, of course, possible to make a similar modification in the gas-liquid contact apparatus 1 of FIG. 1A or the gas-liquid contact apparatus 12 of FIG. 4.

Figure 6:
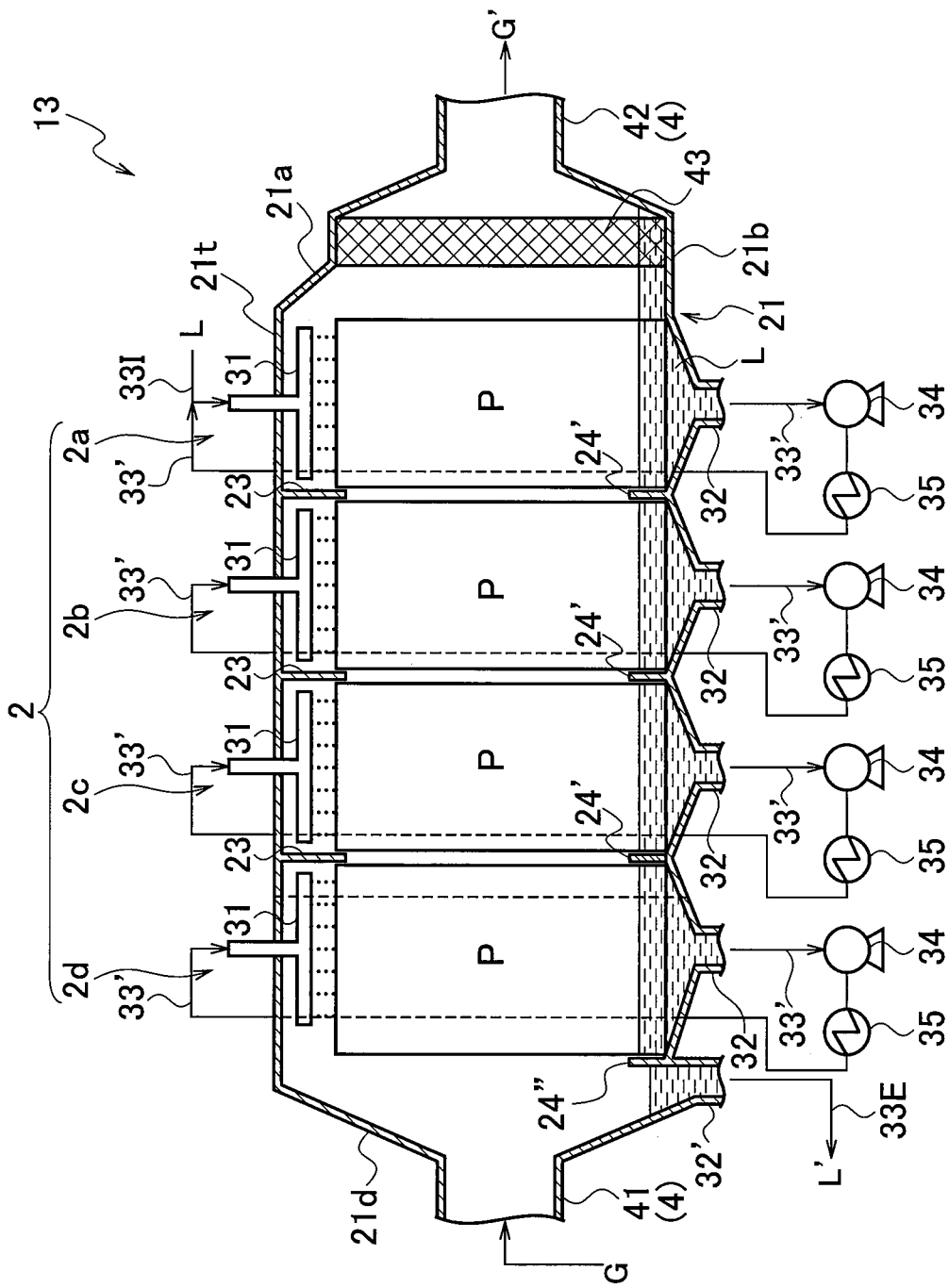
FIG. 6 is a longitudinal sectional view showing another modified example of the gas-liquid contact apparatus.

The liquid supply in which a part of the liquid returns to the original stage without being supplied to the next stage as shown in FIG. 5 is also possible in other forms. For example, FIG. 6 shows one modified example of the embodiment of FIG. 1A, which enables partial return of the liquid. In the gas-liquid contact apparatus 13 of FIG. 6, the branch pipe shown in FIG. 5 is not used, but a structure that can maintain the liquid level of the liquid stored at the bottom at a desired level is used, by setting the height of the partition walls 24' provided at the boundary between the stages. That is, using the property that, when the liquid level reaches the height of the partition wall 24', the liquid overflows due to the increase in the amount of liquid and moves to the next stage, the liquid is transferred stepwise from the stage 2a toward the stage 2d. Along with this, the connection of the piping 33 in FIG. 1A is changed so that the liquid stored at the bottom of each stage returns to the liquid distributor 31 of that stage.

Specifically, the piping of the gas-liquid contact apparatus 13 of FIG. 6 is composed of an introduction pipe 33I, reflux pipes 33', and a discharge pipe 33E. The introduction pipe 33I is connected to the liquid distributor 31 of the stage 2a to which the liquid is first supplied, and the liquid supplied from the liquid distributor 31 to the flat plates P flows down to the bottom of the stage 2a. The reflux pipes 33' respectively connect each of the plurality of liquid distributors and the plurality of liquid recovery ports so that the liquid recovery port 32 and the liquid distributor 31 in each stage communicate with each other. Therefore, when the pump 34 on the reflux pipe 33' is driven, the liquid recovered from the liquid recovery port 32 recirculates to the liquid distributor 31, and is supplied repeatedly to the flat plates P in each stage. By the liquid supply from the introduction pipe 33I, the amount of liquid stored at the bottom of the stage 2a increases, and reaches the height of the partition wall 24'. Then the liquid corresponding to the newly supplied amount overflows from the bottom of the stage 2a to the adjacent stage 2b. Therefore, the amount of liquid that remains in each stage is regulated to a predetermined amount, and when it exceeds this amount, the excess amount of liquid is supplied to the bottom of the stage to which the liquid is next supplied. Therefore, the ratio of the liquid supplied to the next stage to the liquid flowing back to the original stage can be set and changed by the height of the partition wall 24'.

In the gas-liquid contact apparatus 13, the length of the container 21 is extended such as to have a liquid recovery port 32' between the end wall 21d of the container 21 and the stage 2d, and a partition wall 24" is also provided at the boundary between the stage 2d and the liquid recovery port 32'. The discharge pipe 33E is connected to the liquid recovery port 32'. Therefore, when the liquid stored at the bottom in the stage 2d overflows the partition wall 24", it is discharged from the liquid recovery port 32' through the discharge pipe 33E. Although the liquid recovery port 32' is provided at the bottom of the container 21 in FIG. 6, it may be changed to be provided at the side wall or the end wall 21 of the container 21. In that case, the height at which the liquid recovery port 32' is provided may be set so that the amount of liquid exceeding a desired liquid level at the bottom of the stage 2d overflows from the liquid recovery port 32'. Thereby, the partition wall 24" can be omitted to avoid extension of the longitudinal length of the apparatus.

FIG. 7 shows another modification that enables the partial reflux of the liquid in the embodiment of FIG. 1A. In the gas-liquid contact apparatus 14 of FIG. 7, the liquid supply system has a plurality of liquid recovery ports 32 similar to those in FIG. 1A, and the piping 33 connecting the plurality of liquid distributors and the plurality of liquid recovery ports. However, as shown in FIG. 7, the liquid distributors provided in the respective stages have a change such that liquid distributors 31b, 31c, 31d are capable of supplying the liquid across two stages of the stage installed and its previous stage. Along with this, the installation positions of the partition walls also have a change, as shown by partition walls 23' of FIG. 7. The height of the partition wall 23' is set to a height at which it abuts on the upper ends of the flat plates P.

In the embodiment of FIG. 7, a plurality of liquid distributors 31a to 31d are installed on the upper side of each of the plurality of stages 2a to 2d. Of the liquid distributors 31a to 31d, the liquid distributor 31a provided in the stage 2a, to which the liquid is first supplied, has a shorter length in the longitudinal direction (i.e. the arrangement direction of the stages) than the liquid distributor 31 of FIG. 1A. On the other hand, the liquid distributor 31d provided in the stage 2d to which the liquid is finally supplied has a longer length in the longitudinal direction, and the reduced length of the liquid distributor 31a is equal to the increased length of the liquid distributor. Except for the first and last stages of liquid supply, the liquid distributors 31*b* and 31*c* of the stages 2*b* and 2*c* have the same length as the liquid distributor 31 of FIG. 1A. That is, in each of the stages other than the stage to which the liquid is first supplied, the liquid distributor is in such arrangement as to be capable of supplying the liquid across two stage, i.e. the stage installed and its previous stage. Therefore, the point where the liquid is supplied from the liquid recovery port 32 of one stage to the liquid distributor of the next stage through the piping 33 by driving the pump 34 is the same as in the embodiment of FIG. 1A. However, the liquid supplied to the liquid distributor is distributed and supplied to the flat plates P of the next stage and the flat plates P of the original stage. Since the liquid distributor supplies the liquid over two stages, the position of the partition wall 23' provided on the top plate 21*t* is out of the stage boundary. The role of the partition wall 23' is to prevent the gas G from escaping from the space between the flat plates P and passing through the upper space, so that the installation position thereof is not limited to the boundary of the stages and may be appropriately changed. In the embodiments of the gas-liquid contact apparatus shown in FIG. 1A, FIG. 6 and FIG. 7, the shielding effect is increased by increasing the number of partition walls 23, 23' installed. A partition wall having a form that shuts off the space between the top plate 21*t* and the liquid distributor is also useful.

When performing gas-liquid contact in a pressurized or depressurized state, an apparatus having a round shape is normally designed so that the action of pressure is dispersed, in order to cope with the pressure. The laterally long container 21 of the gas-liquid contact apparatus can be modified into various axial shapes. For example, in the above-described embodiments of the gas-liquid contact apparatus, the container 21 may be modified to have a round shape such as a cylindrical shape or an elliptic cylindrical shape, for the purpose of coping with the pressure. However, in this case, a space having an arcuate cross section is formed between the circumferential side wall of the container and the side end of the flat plates P. Therefore, a blocking wall for preventing the gas G from escaping from the space between the flat plates P and flowing in the space on both sides may be provide at each boundary of the stages of the gas-liquid contact portion. In this regard, it is possible, in the multi-tier packing materials 22*a* and 22*b* as shown in FIG. 2A and FIG. 2B, to increase the number or width of the flat plates P in the middle tier from the uppermost tire and the lowermost tire, to vary the width in each tire of the packing material to some extent. Therefore, while using the packing material 22*a* or 22*b* having a multi-tier structure as shown in FIG. 2A or FIG. 2B, a modification is possible such that the space between the side wall of the container and the packing material is reduced to some extent. In this case, it is advisable to improve the length and the shape of the liquid dropping member (nozzle, guide claw, etc.) of the liquid distributor so that the liquid can be supplied to the flat plates P in the middle tier of the multi-tier packing material. In this case, also, a blocking wall for preventing the gas G from flowing between the side wall of the container and the flat plate P can be used together.

In the above-described embodiments, the container 21 of the gas-liquid contact apparatus extends in the horizontal lateral direction, and the arrangement direction of the plurality of stages 2*a*, 2*b*, 2*c*, 2*d* of the gas-liquid contact portion 2 is horizontal. However, the direction in which the plurality of stages of the gas-liquid contact portion 2 are arranged is not limited to the horizontal direction, and may be an inclined lateral direction. Specifically, it may have a structure in which a plurality of stages are arranged in a staircase pattern by providing a step between adjacent stages. In this case, if the liquid supply system is configured such that the liquid sequentially flows from the uppermost stage to the lowermost stage, energy efficiency is good. Such a tilted arrangement may be used in the installation of the apparatus utilizing a sloping ground.

In the above-described embodiments, the gas G that contacts the liquid L is supplied from the outside to the gas-liquid contact portion. That is, the gas-liquid contact apparatus has a gas introduction port for supplying the gas from the outside. These embodiments can be directly applied to a gas purifier, a gas separator, a cooling device and the like. On the other hand, in a regenerator that regenerates a liquid (absorption liquid) that has absorbed a specific gas component, there is also a mode having no gas introduction port. When regenerating an absorption liquid used in a gas separator that separates an acidic gas such as carbon dioxide, sulfur oxides, etc. contained in the gas, the absorbed gas component is possibly released from the absorption liquid. At that time utilized are a shift of the gas-liquid concentration equilibrium due to temperature rise, stripping due to the contact with water vapor, and the like. In a regenerator for an absorption liquid containing an alkanolamine-based absorbent used in the separation and recovery of carbon dioxide, the absorption liquid is heated, generally, to a temperature near the boiling point, and gas-liquid contact with the released hot carbon dioxide and steam further promotes the release of carbon dioxide. Therefore, when applying the above-described embodiments to such a regenerator, it is preferable to provide equipment for supplying thermal energy to the liquid, instead of the gas introduction port. For example, a heating device such as a heater or a heat exchanger is installed and regeneration heat is supplied from the outside to heat the absorption liquid at one end of the gas-liquid contact portion. As a result, carbon dioxide is released from the heated absorption liquid and high-temperature gas (carbon dioxide, water vapor) released is supplied to the gas-liquid contact portion, and regeneration proceeds in gas-liquid contact with the absorption liquid supplied to the gas-liquid contact portion. The released gas is discharged from the gas discharge port. Therefore, in the form of the regenerator, the heating device that supplies the heat of regeneration acts as an element of the gas supply system that supplies the gas to the gas-liquid contact portion.

Figure 8A:
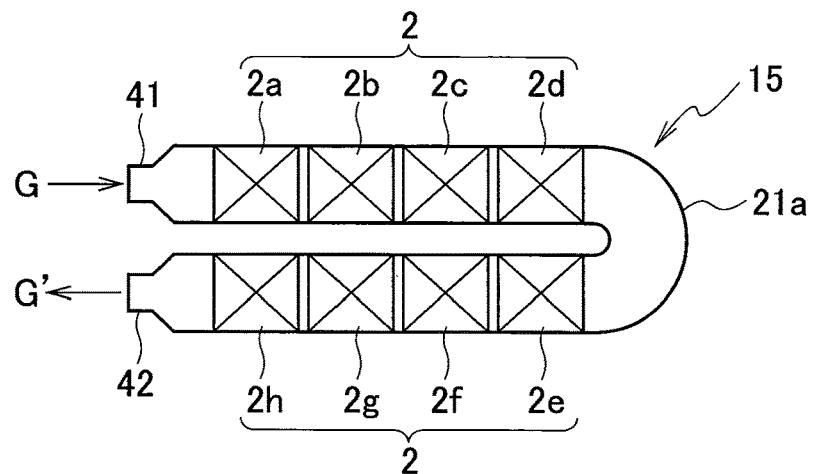
FIG. 8A, FIG. 8B and FIG. 8C are schematic configuration views showing modified examples of the container of the gas-liquid contact apparatus from the top.
Figure 8B:
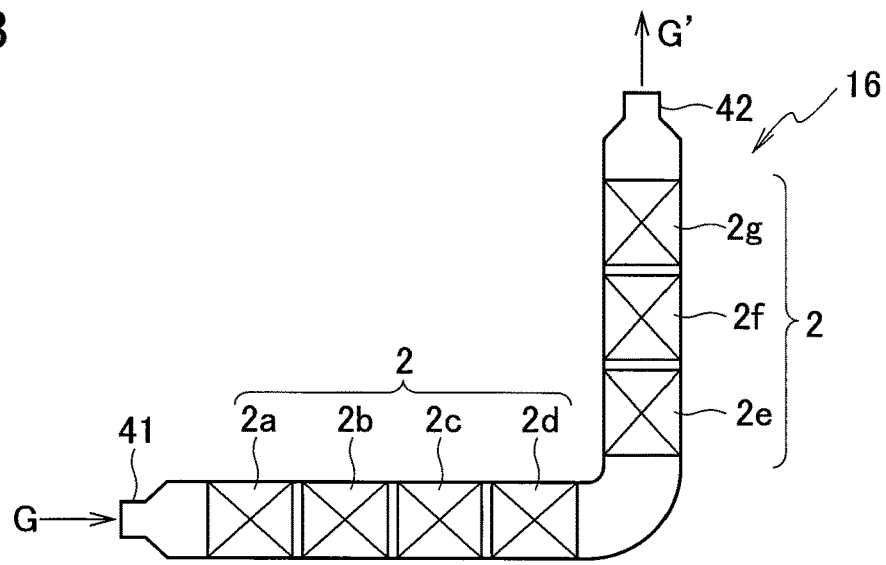
Figure 8C:
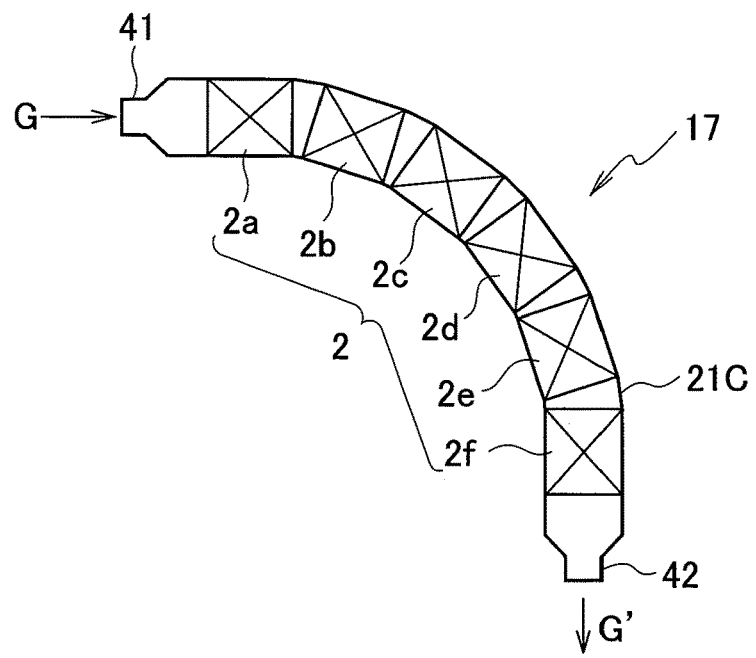

Further, the arrangement of the stages of the gas-liquid contact portion in the above-described embodiments is linear, and the shape of the container 21 is a shape that extends linearly in the lateral direction. However, it is not limited to this form. That is, it may have a shape in which the longitudinal direction of the oblong container bends or curves. For example, the shape of the container may be gently curved, or a corner or a curve may be partially provided to bend or curve the container. Such a modification is possible, for example, by providing an appropriate space between the stages of the gas-liquid contact portion and changing the arranging direction of each stage using this space. By such a manner, a gas-liquid contact apparatus having a bent shape such as an L-shape, a Z-shape, a U-shape, an S-shape, or a curved shape along a circle or an ellipse can be configured. Examples of such a container are shown in FIG. 8A to FIG. 8C. Note that FIG. 8A to FIG. 8C show schematic configuration of the apparatus viewed from above for expressing the shape of the container, and the description of the liquid supply system and the like is omitted.

FIG. 8A shows a gas-liquid contact apparatus 15 in which the stages 2a to 2h of the gas-liquid contact portion 2 are allocated in a container 21A curved in U-shape. FIG. 8B shows a gas-liquid contact apparatus 16 in which the stages 2a to 2g of the gas-liquid contact portion 2 are assigned in the container 21B curved in a substantially L-shape. The containers 21A and 21B of the gas-liquid contact apparatuses 15 and 16 of FIG. 8A and FIG. 8B have two linear portions and one curved portion. The gas-liquid contact portion 2 is divided into two parts that are assigned to each of the linear portions, and the curved portion is configured to make continuous the gas-liquid contact portion. In these examples, the container is relatively easy to design, and these are easy to design in a form in which the packing material can be easily loaded.

On the other hand, FIG. 8C shows a gas-liquid contact apparatus 17 in which the container 21C is curved in an arc shape as a whole. In this container 21C, the arranging direction of each stage of the gas-liquid contact portion is gradually changed by utilizing the each space between the stages of the gas-liquid contact portion 2. In this way, each stage of the gas-liquid contact portion can be arranged along the longitudinal direction of the curved container. Such a deformation of the container is useful for installing the gas-liquid contact apparatus having a shape suitable for the site conditions, and can be used for reducing the installation space. The containers 21A and 21B of the gas-liquid contact apparatuses 15 and 16 of FIG. 8A and FIG. 8B respectively have a curved portion whose side wall is smoothly curved. However, it may be configured as a cornered bend portion by bending the straight side wall. In this case, similarly, each stage of the gas-liquid contact portion is disposed along the longitudinal direction of the bent container. The shape of the side wall of the container, which is curved without being angular, can prevent the flow of gas from being disturbed and is effective in reducing the flow resistance. Therefore, designing the shape of the container in consideration of the above point is useful for improving energy efficiency.

Figure 9:
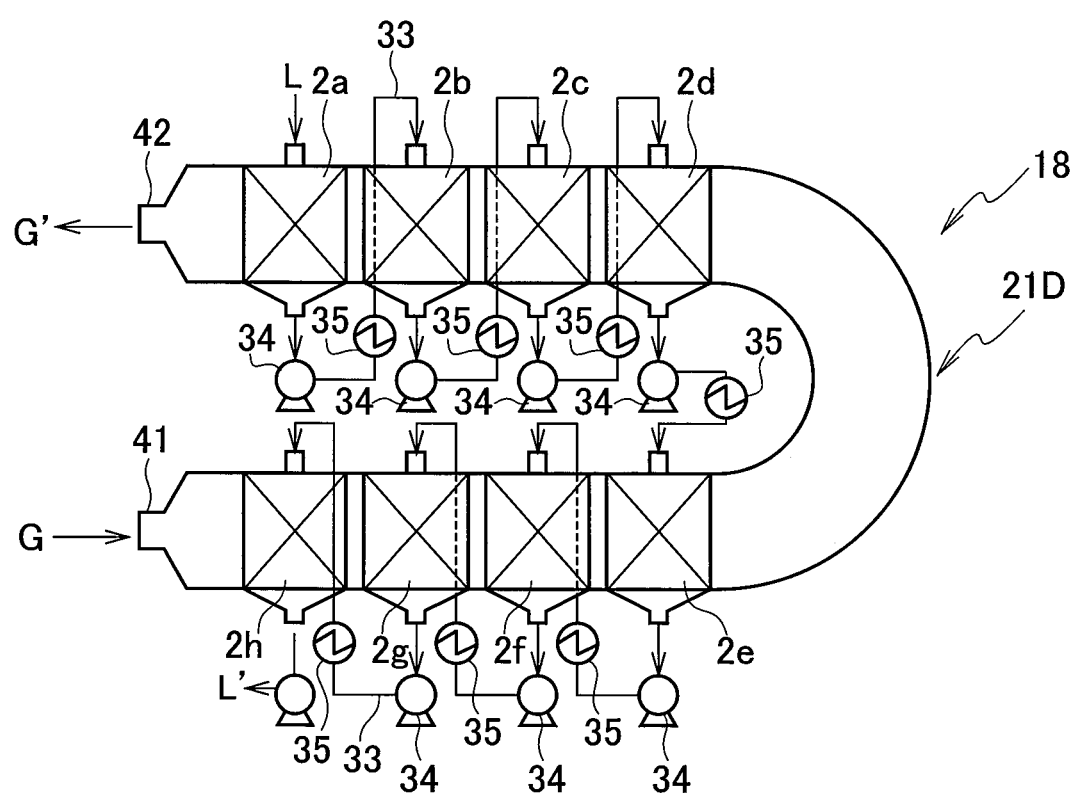
FIG. 9 is a schematic configuration view showing another modified example of the container of the gas-liquid contact apparatus from the side.

Further, the container of the gas-liquid contact apparatus can be curved three-dimensionally, and two or more floors may be constructed within the allowable range of the durability of the apparatus. FIG. 9 is a schematic side view showing the structure of the gas-liquid contact apparatus 18 having a two-story structure. The container 21D of the gas-liquid contact apparatus 18 has two linear portions that form the first-floor portion and the second-floor portion, respectively, and a curved portion that connects them. The curved portion curves along a vertical plane. The stages 2a, 2b, 2c, 2d of the gas-liquid contact portion are assigned to the second-floor portion, and the stages 2e, 2f, 2g, 2h are assigned to the first-floor portion. Similar to the above-described embodiments, the piping 33, the pumps 34, and the heat exchangers 35 are provided as the liquid supply system, and the liquid L is supplied to the stage 2a of the second-floor portion. The liquid L to be supplied flows sequentially from the stage 2a to the stage 2d, which is then supplied to the stage 2e in the first-floor portion and, similarly, flows sequentially to the stage 2h. The liquid in the upstairs stage 2f can be supplied to the downstairs stage 2e by utilizing gravity. Therefore, in that case, the pump 34 as a power source for supplying the liquid from the stage 2f to the stage 2e may be omitted.

In the gas-liquid contact apparatus 18 of FIG. 9, the gas introduction port 41 is provided on the end wall of the first-floor portion of the container 21D, and the gas discharge port 42 is provided on the end wall of the second-floor portion. Therefore, it is configured to perform counter-current gas-liquid contact. However, the gas introduction port 41 and the gas discharge port 42 may be arranged in reverse to form a co-current type gas-liquid contact apparatus. Further, the gas-liquid contact apparatus 18 of FIG. 9 can be modified so as to be installed on a sloping ground. Specifically, the curved portion connecting the first-floor portion and the second-floor portion of the container may be inclined so as to bend along the inclined ground. As a result, the first-floor portion and the second-floor portion can be installed in parallel along the inclined ground.

Figure 10A:
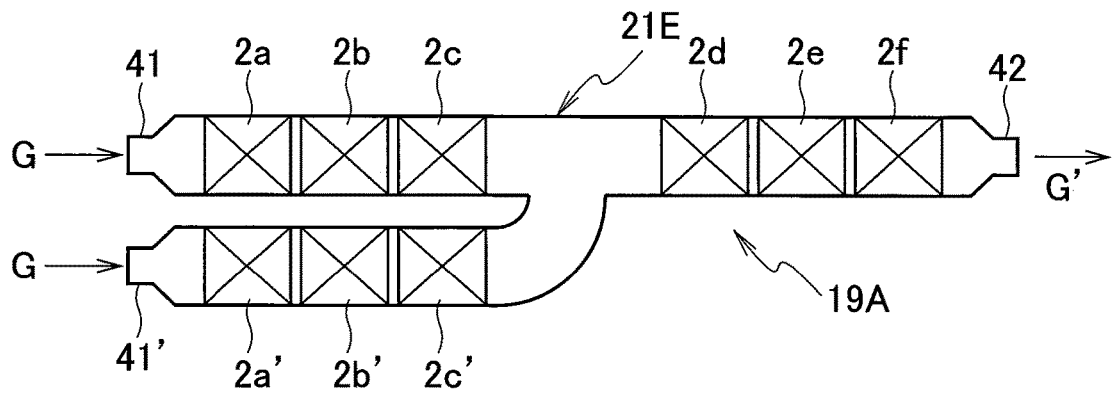
FIG. 10A, FIG. 10B and FIG. 10C are schematic configuration views showing still other modifications of the container of the gas-liquid contact apparatus from the top.

Alternatively, the lateral multi-stage gas-liquid contact apparatuses described above can be configured to have a laterally long container in a shape in which the longitudinal direction is branched. In this case, since the gas-liquid contact apparatus has at least three ends in the longitudinal direction, at least one of the gas introduction port and the gas discharge port is provided in plural. When using the gas-liquid contact apparatus as an absorber, the amount of gas discharged from the absorber is smaller than the amount of gas supplied, and the ratio of gas-liquid contact at each stage of the gas-liquid contact portion changes according to the gas flow direction. By this reason, the gas-liquid contact apparatus can be designed in a branched shape such as a Y-shape or a T-shape, and the gas is then supplied from two gas supply ports and the processed gas is discharged from one gas discharge port. With this configuration, it is possible to improve the above issue. Similarly, the branched-shape gas-liquid contact apparatus is useful even when the gas flow rate increases due to the gas-liquid contact. For example, when using as a regenerator, the flow rate of carbon dioxide generated from the regenerated absorption liquid increases toward the gas discharge port. Therefore, the gas-liquid contact apparatus can be configured to discharge the carbon dioxide from the two gas discharge ports thereof. Further, it is also useful in a reaction device or the like which advances such a reaction that the liquid reacts to generate a new gas component. FIG. 10A to FIG. 10O show embodiments of the gas-liquid contact apparatus configured in a branched shape. Note that FIG. 10A to FIG. 10O show schematic configuration diagrams viewed from above of the apparatus, for illustrating the shape of the container, and depiction of the liquid supply system, etc. is omitted.

Figure 10B:
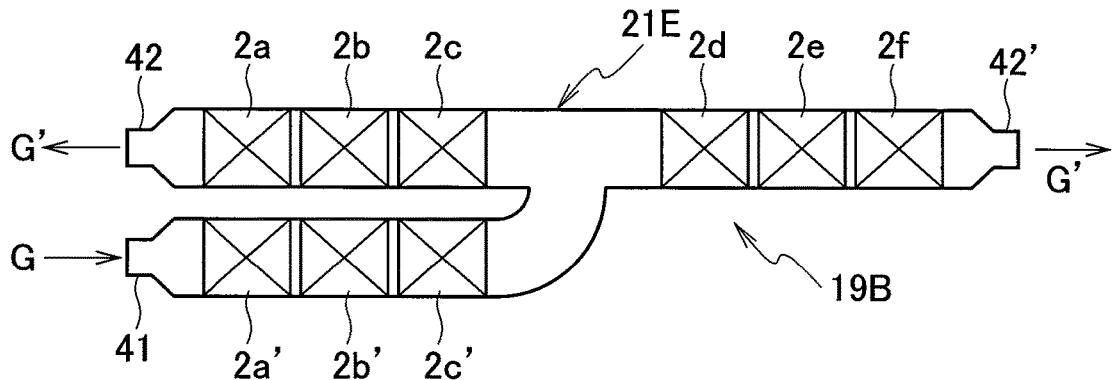

FIG. 10A and FIG. 10B describe gas-liquid contact apparatuses 19A and 19B having a branched form. The gas-liquid contact apparatuses 10A and 19B have a container 21E, that is of the same shape, but differ in the arrangement of the gas introduction port and the gas discharge port. In the gas-liquid contact apparatus 19A, a part of the gas G is supplied from the gas introduction port 41 and flows through the stages 2a, 2b, 2c of the gas-liquid contact portion in order. The rest of the gas G is introduced from the gas introduction port 41' and flows through the stages 2a', 2b', 2c' of the gas-liquid contact portion in order. These merge, and then flow through the stages 2d, 2e, 2f of the gas-liquid contact portion in order, to be discharged from the gas discharge port 42. On the other hand, in the gas-liquid contact apparatus 19B, the gas G flows from the gas introduction port 41 through the stages 2a', 2b', 2c' of the gas-liquid contact portion in that order, and is then divided. Then a part of the gas sequentially flows through the stages 2c, 2b, 2a of the gas-liquid contact portion and is discharged from the gas discharge port 42, and the rest part flows through the stages 2d, 2e, 2f of the gas-liquid contact portion in order and is discharged from the gas discharge port 42'. Therefore, the gas-liquid contact apparatus 19A of FIG. 10A is useful in applications where the gas flow rate decreases with gas-liquid contact, and the gas-liquid contact apparatus 19B of FIG. 10B is helpful in applications where the gas flow rate increases with gas-liquid contact.

Figure 10C:
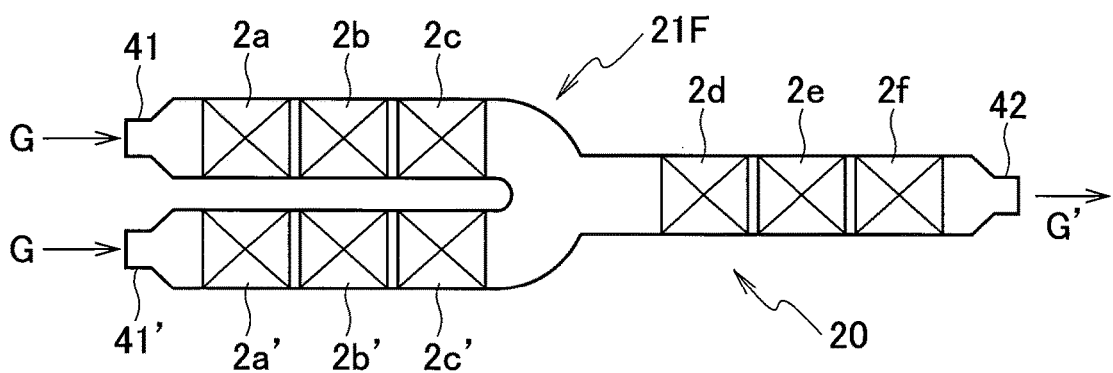

In the gas-liquid contact apparatuses having a branched shape as shown in FIG. 10A to FIG. 10C, it is appropriate to branch also the liquid supply path corresponding to the branched shape. For example, in the gas-liquid contact apparatus 19A of FIG. 10A, the liquid supply system is configured to supply the liquid to the stage $2f$ of the gas-liquid contact portion and divide the liquid discharged from the stage $2d$ into the stage $2c$ and the stage $2c'$. Thereby counter-current gas-liquid contact can be performed. On the contrary, if it is configured to supply the liquid from the stages $2a$ and $2a'$ of the gas-liquid contact portion and discharge from the stage $2f$, co-current type gas-liquid contact is obtained.

In use of the gas-liquid contact apparatus 19A of FIG. 10A as an absorber, if the content composition of the gas G fluctuates greatly, it is efficient to use in such a manner as to adjust the rate of the gas to be introduced according to the composition fluctuation. Specifically, the gas flow that flows from the gas introduction port 41 to the gas discharge port 42 is set as the basic configuration. Then the gas is divided to be introduced so that, when the ratio of the absorbed component contained in the gas increases, the proportion of the gas supplied from the gas introduction port 41' increases in accordance with the increase of that component ratio. With this configuration, the treatment can be appropriately continued within the absorption capacity of the absorption liquid. Further, in the gas-liquid contact apparatus 19B of FIG. 10B, if interchanging the gas introduction port and the gas discharge ports, it turns into a useful form in the application that the gas flow rate decreases with gas-liquid contact. Then the gas flows from the stage $2a$ and the stage $2f$ toward the stage $2a'$ of the gas-liquid contact portion. This form is suitable, for example, when the ratio of gas decrease caused by the gas-liquid contact is large.

In use of the gas-liquid contact apparatus 19A of FIG. 10A as an absorber, if the fluctuation of the content composition of the gas G is small, a gas-liquid contact apparatus 20 as shown in FIG. 10C becomes useful. The container 21F of the gas-liquid contact apparatus 20 has a shape in which the stages $2a$ to $2c$ and the stages $2a'$ to $2c'$ are branched in line symmetry with respect to the stages $2d$ to $2f$ of the gas-liquid contact phase. Therefore, in this embodiment, it is suitable to handle the stages $2a$ to $2c$ and the stages $2a'$ to $2c'$ equally. Then the flow resistance becomes small and a good gas flow can be formed when the gas is equally divided into two and supplied to the stage $2a$ and the stage $2a'$.

The shape of the container as shown in FIG. 10A to FIG. 10C can be deformed into a T-shape, or can be deformed into of an even arrangement such that the gas introduction port and the gas discharge port are located at the vertices of an equilateral triangle. Further, in the forms of FIG. 10A to FIG. 10C, the branch is made so that the number of the introduction side or the number of the discharge side is two, but it may be branched so that the number becomes more than that. For example, they can be configured in a form of providing, in a cross-shaped container, three gas introduction ports and one gas discharge port, or one gas introduction port and three gas discharge ports. Further, the number of stages of the gas-liquid contact portion arranged on each of the upstream side and the downstream side of the branching/merging point is not limited to those shown in the drawings, and it can be changed appropriately. Therefore, such a modification is possible as to partially increase or decrease the number of stages and extend the container, as necessity arises.

In the lateral multi-stage gas-liquid contact apparatus, it is relatively easy to extend the container to increase the number of stages of the gas-liquid contact portion, and it is possible to change the number of stages as necessary. As described above, gas-liquid contact is usable for various purposes. Therefore, by utilizing gas-liquid contact in the increased stage for other purpose, various functions can be given to the gas-liquid contact apparatus. That is, the lateral multi-stage gas-liquid contact apparatus is suitable for integrating gas-liquid contact devices for different purposes. For example, it is possible to integrate a desulfurization device that removes sulfur oxides from gas using gas-liquid contact, a cleaning device that removes liquid-soluble components from gas, a cooling device that cools gas, etc. by installing them inside the gas-liquid contact apparatus. The above-described embodiments relate to a basic configuration as a gas-liquid contact apparatus, and, between the gas-liquid contact portion thereof and the gas introduction port or the gas discharge portion, another gas-liquid contact portion having the above-described function can be formed by using the flat plates. For example, in a case of using the gas-liquid contact apparatus as a carbon dioxide absorber, it is suitable to provide a desulfurization section in the preceding stage of the gas-liquid contact portion, and providing a cleaning section, a cooling section, etc. after the gas-liquid contact portion, as described above. In that case, liquids such as desulfurization liquid, cleaning liquid and cooling water may be individually supplied to the respective sections formed by using the flat plates, and gas and each liquid may be brought into gas-liquid contact. When the gas to be treated has a high temperature, the absorber may be configured to cool the gas to a desired temperature by further providing a cooling section between the gas introduction port and the desulfurization section. In this way, in the lateral multi-stage gas-liquid contact apparatus, the number of stages of the gas-liquid contact portion can be easily increased or decreased as necessary. Therefore, it is advantageous in adding other functions or simplifying the components of the system.

With the packing material composed of flat plates, it is possible to keep low the manufacturing and processing cost. Further, it is possible to suppress the flow resistance, thereby reducing the operating cost. Therefore, the gas-liquid contact apparatus as described above is useful as a gas-liquid contactor that requires large-capacity processing and high-speed processing.

Examples of the gas G processed by the gas-liquid contact apparatus as described above include a waste gas (exhaust gas) and a reaction gas generated in facilities such as chemical plants and thermal power plants. Acidic gases such as carbon dioxide, nitrogen oxides, sulfur oxides, and the like are often processed as the specific component. The liquid L to use as the absorption liquid is selected according to the specific component to be removed from the gas G. For recovery and removal of carbon dioxide, for example, an aqueous solution of an alkali agent such as a cyclic amine compound, an alkanolamine, a phenolamine, an alkali metal salt, etc. is often used. An aqueous solution of an alkaline agent such as a calcium compound or a magnesium compound is generally used for removal of sulfur oxides. In an aqueous solution of monoethanolamine (MEA) that is often used in recovery of carbon dioxide, reaction with carbon dioxide produces carbamate salt/amine salt (carbamate), carbonate, bicarbonate and the like.

Therefore, each part constituting the gas-liquid contact apparatus is made of a material having resistance to the components of the gas G and the chemical agents contained in the liquid L as described above. Examples of such a material include metals such as stainless steel, aluminum, nickel, titanium, carbon steel, brass, copper, monel metal, silver, tin, niobium, and resins such as polyethylene, polypropylene, PTFE, etc. At least the surface of the flat plate P constituting the packing material is also made of a corrosion-resistant material that does not cause a reaction (corrosion) with the gas G to be treated and the liquid L to be used as described above. The material may be one in which fine irregularities are formed on the surface by means of surface finishing such as filing, sand blasting treatment, ultraviolet ozone treatment, plasma treatment or the like to impart surface roughness. In addition, the material may be one prepared to meet the above-described use conditions by modifying the surface by means of coating or the like. The flat plate P is a flat plate or thin layer material having a uniform thickness, and the material and the thickness thereof can be appropriately selected to maintain a suitable strength according to the conditions of gas-liquid contact. A mesh plate material such as a wire mesh using a metal wire, a punched metal plate, an expanded metal plate or the like is a plate material capable of reducing the weight while maintaining the strength to stand alone as a single body, and it exhibits excellent property also in wet spreading of liquid. Therefore, when the mesh is extremely fine, it can be handled in the same manner as a flat plate and may be used to form the packing material 22, 22a, 22b of the gas-liquid contact apparatus.

Further, application of the gas-liquid contact apparatus is not limited to the gas-liquid contact apparatus for absorbing, separating or removing a specific component as described above. It is also possible to apply to devices (cooling towers, heating towers, desorption towers (regeneration towers), etc.) which are used in cooling, heating, desorption and the like included in processes of various chemical plants.

A gas-liquid contact apparatus with good energy efficiency at the time of operation can be provided and good gas-liquid contact and efficient component transfer can be realized while suppressing pressure loss. Therefore, it is useful as a cooling tower, a heating tower, an absorption tower, a diffusion tower (regeneration tower), a washing tower, and the like. It is possible to contribute to improvement of efficiency in chemical treatment and manufacturing processing, prevention of environmental pollution by popularization of treatment of exhaust gas such as combustion gas and the like, with generalization based on improved economic efficiency. Moreover, it is possible to contribute to effective use of resources by reducing the weight of the apparatus and reducing manufacturing and processing cost.

Although the embodiments of the present disclosure have been described above with reference to the accompanying drawings, the present disclosure is not limited to such embodiments. Moreover, it must be understood that various changes or modifications that can be conceived by those skilled in the art are naturally also within the technical scope of the present disclosure, in the scope described in the claims.

What is claimed is:

1. A gas-liquid contact apparatus, comprising:
    a gas-liquid contact portion including a plurality of stages which are allocated so as to be arranged in a lateral direction, each of the plurality of stages having a plurality of vertical flat plates arranged in parallel;
    a liquid supply system which supplies a liquid to the gas-liquid contact portion and causes the liquid to flow along an arrangement of the plurality of stages successively; and
    a gas supply system which supplies a gas to the gas-liquid contact portion,
    wherein the liquid supplied by the liquid supply system flows down on the plurality of vertical flat plates in each of the plurality of stages and comes into contact with the supplied gas.

2. The gas-liquid contact apparatus according to claim 1, wherein the gas supplied to the gas-liquid contact portion sequentially flows along the arrangement through the plurality of stages, and an order in which the liquid supplied by the liquid supply system flows through the plurality of stages is the same as or opposite to an order in which the gas supplied by the gas supply system flows through the plurality of stages.

3. The gas-liquid contact apparatus according to claim 1, wherein the gas supply system has a gas introduction port communicating with a stage through which the gas first flows, a gas discharge port communicating with a stage through which the gas finally flows, and a demister provided in the gas discharge port.

4. The gas-liquid contact apparatus according to claim 1, wherein the plurality of stages are in lateral communication with each other such that the gas supplied by the gas supply system passes through the plurality of stages in the lateral direction, and the plurality of vertical flat plates in each of the plurality of stages are arranged along a direction in which the gas passes.

5. The gas-liquid contact apparatus according to claim 1, wherein the gas supply system further comprises a guide wall which guides the gas so that gas flow in the plurality of stages alternately repeats rising and falling for each stage.

6. The gas-liquid contact apparatus according to claim 1, wherein the gas supply system further comprises a guide wall which forms a communication passage to guide the gas from an upper part of one of the plurality of stages to a lower part of a stage through which the gas flows next, thereby, the gas flows so as to rise between the flat plates in each of the plurality of stages.

7. The gas-liquid contact apparatus according to claim 4, wherein the gas-liquid contact portion further has a partition wall, at boundary of the plurality of stages, which prevents the gas from flowing over or under the plurality of flat plates.

8. The gas-liquid contact apparatus according to claim 1, further comprising a laterally long container, wherein the plurality of stages are assigned in the laterally long container to be arranged in a longitudinal direction.

9. The gas-liquid contact apparatus according to claim 1, wherein the liquid supply system comprises:
    a plurality of liquid distributors provided respectively on the upper side of each of the plurality of stages;
    a plurality of liquid recovery ports provided respectively on the lower side of each of the plurality of stages; and
    a piping which connects the plurality of liquid distributors and the plurality of liquid recovery ports so that, in the plurality of stages, the liquid recovery port of one stage and the liquid distributor of the stage to which the liquid is next supplied are connected.

10. The gas-liquid contact apparatus according to claim 9, further comprising:
    a branch pipe that branches from the piping to connect to the one stage so that a part of the liquid recovered from the one stage returns to the one stage.

11. The gas-liquid contact apparatus according to claim 1, wherein the liquid supply system comprises:
    a plurality of liquid distributors provided respectively on the upper side of each of the plurality of stages to supply the liquid to the plurality of flat plates;

a plurality of liquid recovery ports provided respectively on the lower side of each of the plurality of stages to collect the liquid flowing down the plurality of flat plates;

a piping which connects the plurality of liquid distributors and the plurality of liquid recovery ports so that, in each of the plurality of stages, the liquid recovered from the liquid recovery port is returned to the liquid distributor; and a partition wall provided at the boundary between the plurality of stages, having a height that regulates an amount of liquid remaining in one stage to a predetermined amount in the plurality of stages, and that excess liquid exceeding the predetermined amount flows to the stage to which the liquid is next supplied.

12. The gas-liquid contact apparatus according to claim 1, wherein the liquid supply system comprises:

a plurality of liquid distributors provided respectively on the upper side of each of the plurality of stages;

a plurality of liquid recovery ports provided respectively on the lower side of each of the plurality of stages; and a piping which connects the plurality of liquid distributors and the plurality of liquid recovery ports so that, in the plurality of stages, the liquid recovery port of one stage and the liquid distributor of the stage to which the liquid is next supplied are connected, wherein, in each of the plurality of stages other than the stage to which the liquid is first supplied, the liquid distributor in one stage is arranged to possibly supply the liquid across the two stage of the one stage and the preceding stage.

13. The gas-liquid contact apparatus according to claim 9, wherein the liquid supply system comprises:

at least one heat exchanger provided in the piping for adjusting temperature of the liquid; and a power source for supplying the liquid.

14. The gas-liquid contact apparatus according to claim 8, wherein the laterally long container has a shape in which the longitudinal direction curves or bends, and the plurality of stages are assigned in the laterally container to be arranged in the longitudinal direction curving or bending.

15. The gas-liquid contact apparatus according to claim 8, wherein the laterally long container has a shape in which the longitudinal direction is branched.

16. The gas-liquid contact apparatus according to claim 5, wherein the plurality of vertical flat plates in each of the plurality of stages are arranged along a direction in which the gas passes.

17. The gas-liquid contact apparatus according to claim 6, wherein the plurality of vertical flat plates in each of the plurality of stages are arranged along a direction in which the gas passes.

* * * * *